(12) United States Patent
Obata et al.

(10) Patent No.: US 7,034,838 B2
(45) Date of Patent: Apr. 25, 2006

(54) INFORMATION PROCESSING APPARATUS

(75) Inventors: Yuriko Obata, Tokyo (JP); Norio Michiie, Tokyo (JP); Takao Okamura, Tokyo (JP); Hiromitsu Shimizu, Tokyo (JP); Kiyotaka Moteki, Tokyo (JP); Yasuhiro Hattori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 30 days.

(21) Appl. No.: 10/327,908

(22) Filed: Dec. 26, 2002

(65) Prior Publication Data

US 2003/0132942 A1      Jul. 17, 2003

(30) Foreign Application Priority Data

Dec. 27, 2001  (JP)  ............... 2001-396251
Dec. 27, 2001  (JP)  ............... 2001-396252

(51) Int. Cl.
*G06F 13/00*   (2006.01)
(52) U.S. Cl. .................. 345/537; 345/531; 345/536
(58) Field of Classification Search ........ 345/536–537, 345/531, 555; 382/276
See application file for complete search history.

(56) References Cited

U.S. PATENT DOCUMENTS

| | | | |
|---|---|---|---|
| 5,214,639 A * | 5/1993 | Herion | ............... 370/412 |
| 5,294,944 A | 3/1994 | Takeyama et al. | |
| 5,432,537 A | 7/1995 | Imakawa et al. | |
| 5,610,651 A | 3/1997 | Yamakawa et al. | |
| 5,987,227 A | 11/1999 | Endo et al. | |
| 6,043,897 A * | 3/2000 | Morikawa et al. | ......... 358/1.14 |
| 6,088,703 A * | 7/2000 | Kaneko | .................. 707/104.1 |
| 6,226,102 B1 | 5/2001 | Koike et al. | |
| 6,449,064 B1 | 9/2002 | Hattori et al. | |
| 2003/0132942 A1 | 7/2003 | Obata et al. | |

FOREIGN PATENT DOCUMENTS

JP           363108470 A  *  5/1988

OTHER PUBLICATIONS

U.S. Appl. No. 10/928,481, filed Aug. 30, 2004, Hattori et al.
U.S. Appl. No. 10/327,908, filed Dec. 26, 2002, Obata et al.

(Continued)

*Primary Examiner*—Ulka J. Chauhan
*Assistant Examiner*—Mackly Monestime
(74) *Attorney, Agent, or Firm*—Oblon, Spivak, McClelland, Maier & Neustadt, P.C.

(57) ABSTRACT

An image processing apparatus is provided that includes a primary memory unit to buffer image data, a secondary memory unit to store the image data transferred from the primary memory unit, and a memory control unit that controls both memory units. The memory control unit transfers, if a plurality of items of image data are to be transferred, at least one of the items of image data divisionally from the primary memory unit to the secondary memory unit. When image data are transferred from the primary memory unit to the secondary memory unit, the memory control unit transfers a unit image either in a block or divisionally in multiple parts, and the memory control unit simultaneously transfers a plurality of images divisionally, the images being divided into varying numbers of parts so that each input and output of an image can evenly share the time of the secondary memory unit and a plurality of images can be efficiently transferred in parallel in a short time.

20 Claims, 23 Drawing Sheets

OTHER PUBLICATIONS

U.S. Appl. No. 10/637,690, filed Aug. 11, 2003, Shindoh et al.
U.S. Appl. No. 10/692,792, filed Oct. 27, 2003, Kizaki et al.
U.S. Appl. No. 10/694,062, filed Oct. 28, 2003, Kizaki et al.
U.S. Appl. No. 09/461,738, filed Dec. 16, 1999, Motohashi et al.
U.S. Appl. No. 09/731,724, filed Dec. 08, 2000, Michiie et al.
U.S. Appl. No. 09/964,464, filed Sep. 28, 2001, Moteki et al.
U.S. Appl. No. 10/053,548, filed Jan. 1, 2002, Moteki
U.S. Appl. No. 10/183,499, filed Jun. 28, 2002, Obata et al.
U.S. Appl. No. 10/997,870, filed Nov. 29, 2004, Michiie et al.
U.S. Appl. No. 11/151,409, filed Jun. 14, 2005, Obata et al.
U.S. Appl. No. 11/221,703, filed Sep. 9, 2005, Obata et al.
U.S. Appl. No. 11/222,778, Sep. 12, 2005, Michiie et al.

* cited by examiner

PATTERN A

FIG.19A

PATTERN B

DATA REGION FOR DATA TRANSFER (I)

| DATA TRANSFER OPERATION (I)-1 | (I)-2 |

FREQUENCY OF DATA TRANSFER IS NOT INCREASED

DATA REGION FOR DATA TRANSFER (II)

| DATA TRANSFER OPERATION (II)-1 | (II)-2 |

FIG.19B

FLOW OF DATA TRANSFER OPERATIONS

| (I)-1 | (II)-1 | (I)-2 | (II)-3 |

TIME REQUIRED FOR DATA TRANSFER (II)

EXCESSIVE TIME REQUIRED BY COMPARISON WITH PATTERN A

INFORMATION PROCESSING APPARATUS

BACKGROUND OF THE INVENTION

1. Field of the Invention

The present invention relates to an information processing apparatus, and more particularly, to an information processing apparatus in which a plurality of image files are simultaneously exchanged between a primary memory unit and a secondary memory unit at an optimum efficiency.

2. Description of the Related Art

A digital copier having an image memory unit therein enables a user to manipulate and edit documents while the documents are stored in the image memory unit. Among many functions realized by using the image memory unit, a function called "electronic sorting", for example, uses the image memory unit to electronically sort the documents stored in the image memory unit and free the user from manually sorting. A digital copier having the electronic sorting function scans a plurality of pages, stores an image file of them in the image memory unit thereof, and prints a desired number of sorted copies by repeatedly printing a copy for the desired times. The digital copier having the electronic sorting function, however, requires a considerable memory capacity to store the image file, which causes a cost problem.

The following solutions to solve the cost problem are currently available:

1. using semiconductor memory devices as a primary memory unit and a low-cost storage media device such as a hard disk drive as a secondary memory unit;

2. using semiconductor memory devices as both a primary memory unit and a secondary memory unit, wherein image files to be stored in the secondary memory unit are compressed to reduce the required memory capacity; and 3. in the case of a digital complex apparatus including therein an image scanner, a printer controller, a file server, and a facsimile controller, and so forth, sharing a common memory resource among them.

A memory controller having a direct memory access data transfer mode (hereinafter referred to as a DMA controller or a DMAC) is often used to exchange an image file with such an image memory unit. The DMA controller uses information for controlling a memory region, called a descriptor, and exchanges the image file using a specific region in the image memory. It is possible to divide a memory region in which an image file is to be stored into a plurality of small memory regions and transfer the image file to the memory region using a plurality of descriptors each corresponding to one of the small regions. It is also possible to reduce the required memory capacity by using the image memory unit as a ring buffer, for example.

Since the DMA controller can monitor the beginning and the completion of data transfer designated by each descriptor, and can stop and resume the data transfer even in the middle of the image memory region, for example, the DMA controller is capable of providing flexible timing control and is applicable to a variety of applications.

In the case where a secondary storage apparatus such as a hard disk drive of which bit cost is lower than that of a semiconductor memory is used as a storage memory, such a secondary storage apparatus usually cannot simultaneously perform a plurality of data transfers (a data writing operation or a data reading operation). The DMA controller can virtually realize simultaneous multiple data transfers by dividing a data transfer operation using descriptors for time-sharing.

However, if a time-sharing method is used, time required for data transfer is not reduced. In the case of an image forming apparatus such as a copier and a printer, the data transfer time substantially affects the productivity of the image forming apparatus. The time-sharing method may result in the degrading of productivity.

Accordingly, it is important to reduce time required for data transfer to a secondary memory, apparatus by first compressing the data to reduce the file size thereof and using a secondary memory apparatus having a higher data transfer speed.

Additionally, since the time-sharing method complicates memory control, the secondary memory apparatus is conventionally controlled by an image input/output unit during data transfer instead of using the time-sharing method.

By the way, in the case of a conventional secondary memory apparatus, the speed of data transfer between a semiconductor memory and the conventional secondary memory apparatus is lower than that of data transfer between the image input/output unit and the semiconductor memory. Even if the size of image data is reduced by compressing, the speed of data transfer between the semiconductor memory and the conventional secondary memory apparatus is substantially the same as the speed of data transfer between the image input/output unit and the semiconductor memory. Accordingly, even if the transfer timing of the data transfer (including data conversion processing such as data compression) to the semiconductor memory and the transfer timing of the data transfer to the secondary memory unit are controlled independently and optimally, the productivity of the image forming apparatus is not improved very much.

However, the data transfer speed of secondary memory apparatuses such as a hard disk drive and the data compression rate and processing speed of data compression units is now considerably improved, and a variety of image input/output units that can be connected to an image forming apparatus have become available. Under such a situation, it is difficult to achieve the utmost performance of a memory unit and a data compression unit and improve the productivity using the conventional method of memory control.

SUMMARY OF THE INVENTION

Accordingly, it is a general object of the present invention to provide a novel and useful information storage apparatus in which one or more of the problems described above are eliminated.

Another and more specific object of the present invention is to provide an information storage apparatus having a data transfer control unit that: can improve the usage rate of a memory region and reduce transfer time by applying a memory control method using DMA to a memory unit provided with a primary memory unit (a semiconductor memory, for example), which is mainly used to buffer input/output images, and a secondary memory apparatus (an HDD, for example), which can exchange data with the primary memory unit and store compressed data therein; can control securing and discharging of resources to obtain the utmost usage efficiency depending on the processing capacity of the memory unit; and can control start timing of data transfer operations.

In addition to the above, yet another object of the present invention is to provide an image processing apparatus having the data transfer control unit that, in the case where a plurality of images are simultaneously transferred to the memory region of the secondary memory apparatus, or in the case where an image is transferred, can further perform appropriate transfer control in each case. That is, when input image(s) or intermediate (converted after inputting) image data are transferred to the secondary memory apparatus through a buffer region of the primary memory unit, the data transfer control unit: can prevent too large a memory region from being occupied; can efficiently process a plurality of image signals by optimizing the time in which the secondary memory apparatus is occupied to transfer (input/output) each image; can secure necessary memory regions in the primary memory unit and the secondary memory apparatus; and can secure and control the capacity of the buffer region in the primary memory unit.

To achieve one of the above objects, an image processing apparatus according to the present invention includes a primary memory unit that buffers image data therein, a secondary memory unit that stores therein said image data transferred from said primary memory unit, and a memory control unit that determines whether a plurality of items of image data are to be transferred from said primary memory unit to said secondary memory unit and transfers, if the plurality of items of image data are to be transferred, at least one of the plurality of items of image data divisionally from said primary memory unit to said secondary memory unit.

When image data are transferred from the buffer region of the primary memory unit to the secondary memory unit, a unit image is transferred in a block, or divisionally in a plurality of frequencies, and when a plurality of images are transferred simultaneously, each image is divisionally transferred in a plurality of frequencies so that the plurality of images can be transferred in parallel by time-sharing. Accordingly, each input and output of an image signal can evenly share the time of the secondary memory image, and a plurality of images can be efficiently transferred in parallel in a short time.

Other objects, features, and advantages of the present invention will become more apparent from the following detailed description when read in conjunction with the accompanying drawings.

BRIEF DESCRIPTION OF THE DRAWINGS

FIGS. 19A and 19B are schematic diagrams for explaining a "pattern B" operation according to an embodiment of the present invention, in which image data are divisionally transferred without assigning priority in response to a plurality of requests for data transfer;

DETAILED DESCRIPTION OF THE PREFERRED EMBODIMENTS

A detailed description of the preferred embodiments will be given by reference to the drawings.

Figure 1:
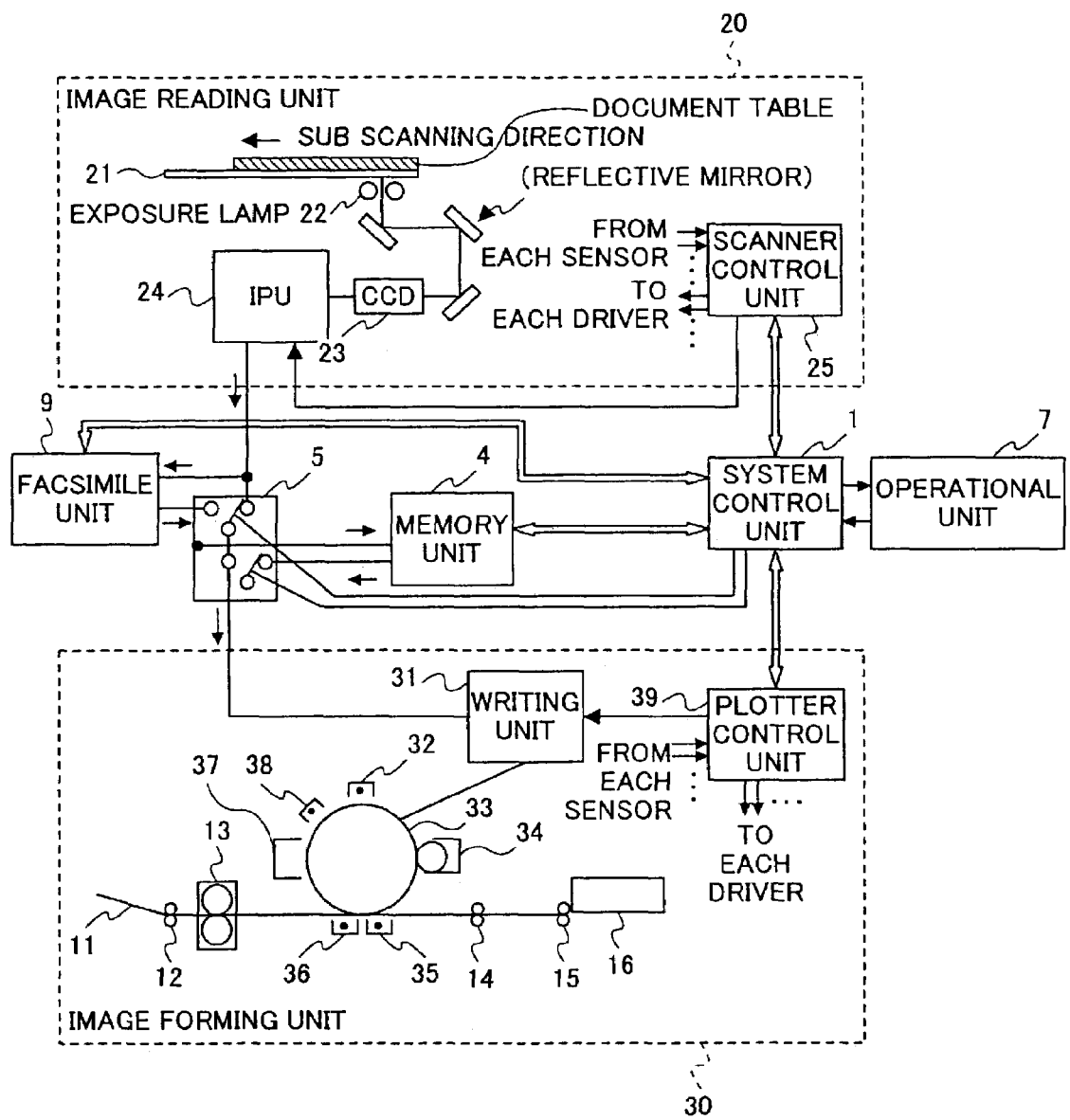
FIG. 1 is a schematic diagram showing a digital copier according to an embodiment of the present invention.

FIG. 1 is a schematic drawing of a digital copier as an example of an information processing apparatus according to an embodiment of the present invention. A scanning process of an image reading unit 20 and an image forming process of an image forming unit 30 will be described below by reference to FIG. 1.

In the scanning process, an exposure lamp 22 moves along a document table 21 scanningly lighting a document. An image sensor 23 such as a CCD captures the light reflected by the document and converts the reflected light into an electrical signal. An image processing unit (IPU) 24 processes the electrical signal by compensating shading and converts the signal into an 8-bit digital signal. The IPU 24 further processes the digital signal by variable power processing, MTF compensation, spatial filter processing, gamma compensation, dither processing, and so forth, and transfers the digital signal to the image forming unit 30 with an image sync signal.

Figure 2:
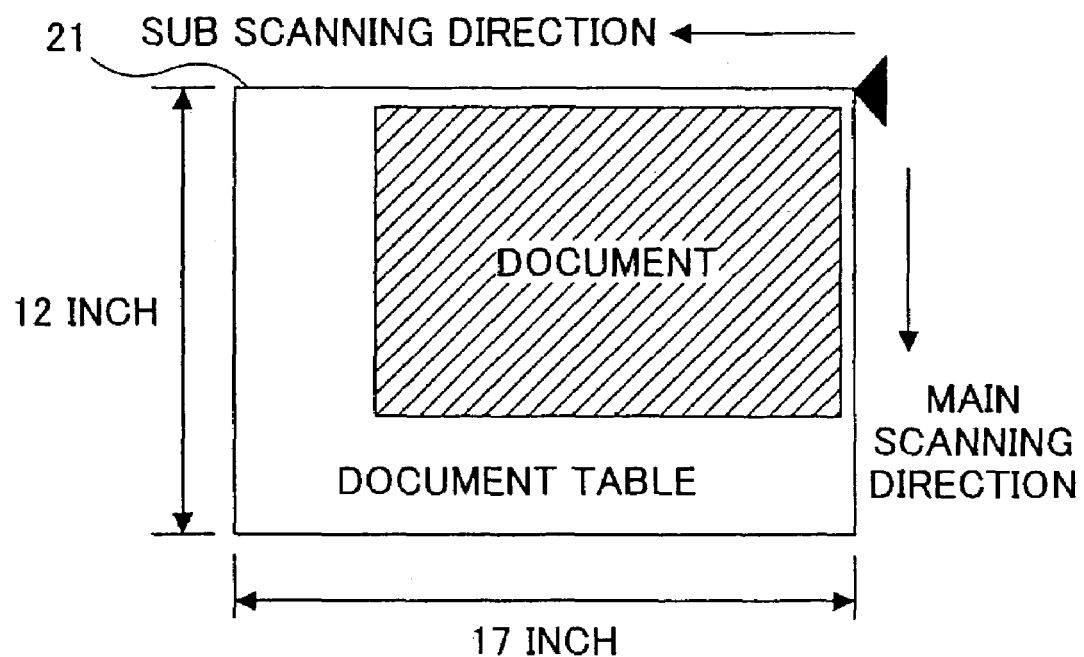
FIG. 2 is a plan view of a document table of the digital copier of FIG. 1.

FIG. 2 is a schematic diagram showing the document table. The main scanning direction is the direction in which CCD 23 scans, and the sub scanning direction is the direction in which the scanner moves. The raster data of the document are captured by scanning the document. A scanner controller 25, in an image reading process, monitors various parameters through sensors, controls a scanning motor and so forth, and set various parameters in the IPU 24.

In an image forming process, a photoreceptor 33 rotating at a constant rotative speed is charged by an electrifying charger 32 and exposed to a laser beam modulated by the image data from a writing unit 31. An electrostatic latent image is formed on the photoreceptor 33 and becomes a manifest toner image by being developed with toner by a developing unit 34. A piece of paper is supplied from a paper supply tray, 16 through a paper feed roller 15, stands by at a resist roller 14, and is transferred to the photoreceptor 33 to the piece of paper in synchronization with the rotation of the photoreceptor 33. A transcript charger 35 transcribes the toner image formed on the photoreceptor 33 to the piece of paper by electrostatic transcription, and a separation charger 36 separates the piece of paper from the photoreceptor 33. A fixing unit 13 fixes the toner image transcribed on the piece of paper by heating it, and an ejecting roller 12 ejects the piece of paper to an ejecting tray 11. On the other hand, a cleaning unit 37 contacts the photoreceptor 33 at a given pressure and removes the toner image remaining on the photoreceptor 33 after the electrostatic transcription. A discharging charger 38 discharges the photoreceptor 33. A plotter controller 39 detects various parameters using various sensors and controls a driving motor and so forth.

Figure 3:
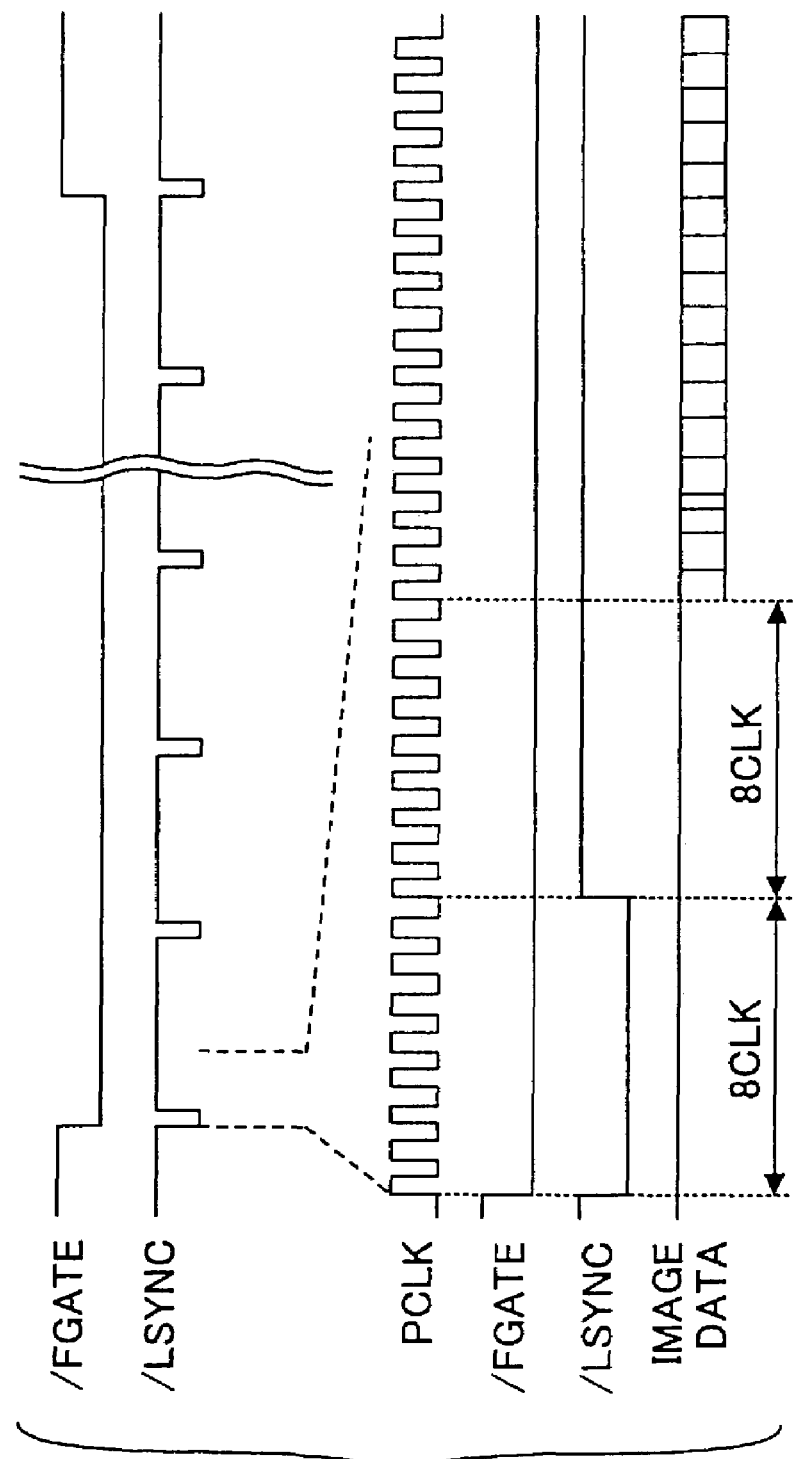
FIG. 3 is a timing diagram showing the waveform of image sync signals output by an IPU of an image reading unit of the digital copier of FIG. 1.

FIG. 3 is a timing diagram showing image sync signals output from the IPU 24 of the image reading unit 20. Each signal will be described by reference to FIG. 3.

A frame gate signal (/FGATE) is a signal indicating an effective range of an image in an image area in the sub scanning direction. While this signal is LOW (low active), the image data are effective. "/FGATE" is asserted at the rising edge of a line sync signal (/LSYNC) and negated at the falling edge of the line sync signal.

"/LSYNC" is asserted for a predetermined number of clocks (8 clocks in this case) at the rising edge of a pixel sync signal (PCLK). The image data in the main scanning direction become effective after the rise of this signal and for a successive predetermined number of clocks (eight clocks in this case). One item of the image data is transferred in one "PCLK" cycle. In FIG. 2, the image is divided at a resolution of 400 DPI with the origin indicated by a triangle. The image data are raster format data starting at the position indicated by the triangle. The effective range of the image data in the sub scanning direction is determined by the size of the piece of paper.

A system controller 1 controls the entire system of the digital copier. The system controller 1 detects the input of an operator through an operational unit 7, sets various parameters of the image reading unit 20, a memory unit 4, the image forming unit 30, and a facsimile unit 9, and gives them instructions to perform processes through communication channels.

The system controller 1 displays the state of the entire system on the operational unit 7. The operator can give the system controller 1 an instruction by pressing keys of the operational unit 7.

In response to an instruction from the system controller 1, a facsimile unit 9 converts image data into binary data based on the G3 or G4 facsimile standard and transfers them through a telephone line. The facsimile unit 9 receives data through the telephone line and reproduces binary image data. The reproduced binary image data are transferred to the writing unit 31 of the image forming unit 30 and processed as described above.

In response to an instruction from the system controller 1, a selector unit 5 switches the source of image data by selecting one of the image reading unit 20, the memory unit 4, the facsimile unit 9.

The memory unit 4 stores image data usually input from the IPU 24 for applications such as "repeat copy" and "rotational copy". The memory unit 4 is also used as buffer memory to temporarily store binary image data from the facsimile unit 9. The system controller 1 gives the memory unit 4 an instruction when data storage is required.

Figure 4:
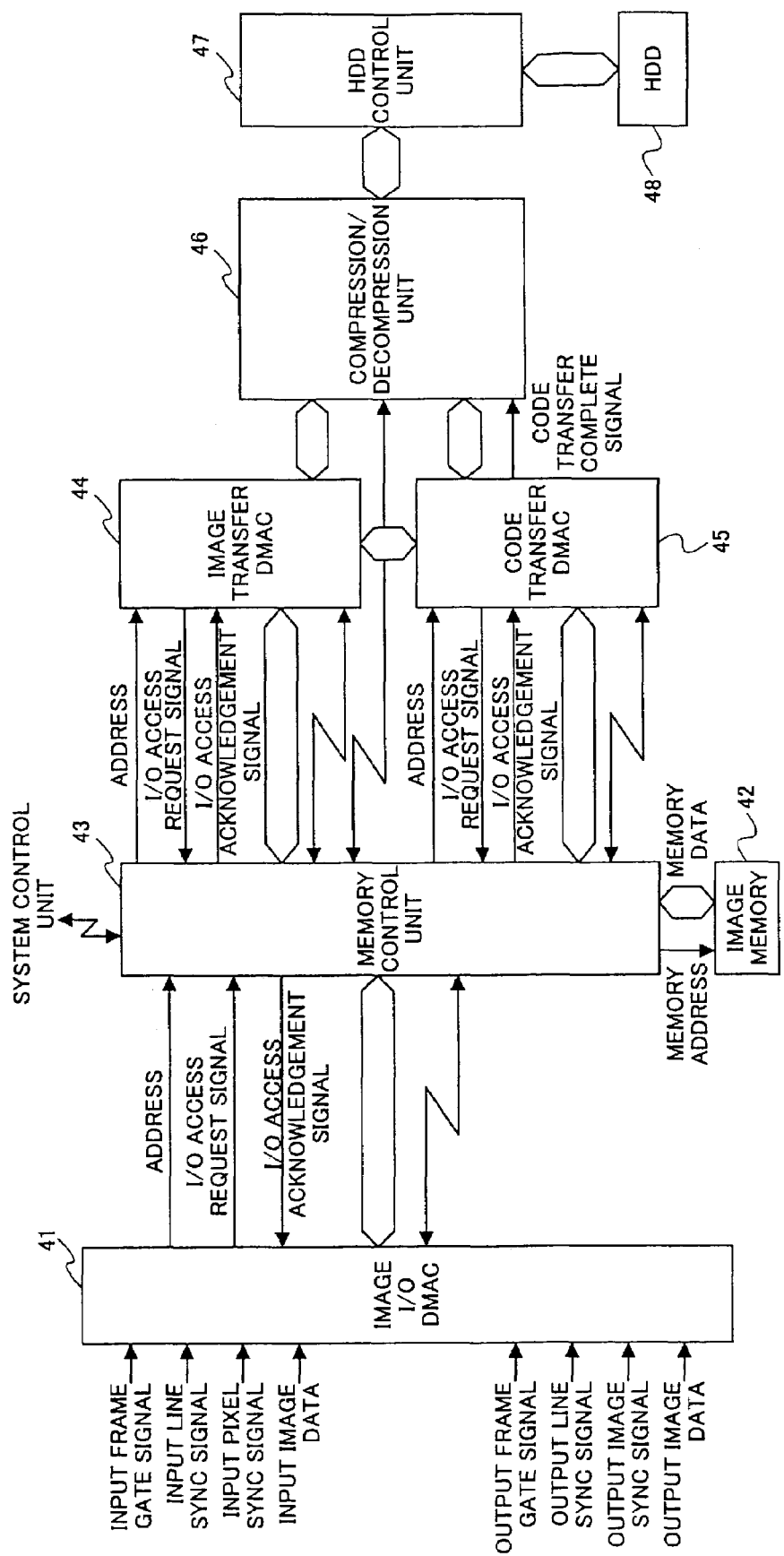
FIG. 4 is a block diagram showing the construction of a memory unit of the digital copier of FIG. 1.

FIG. 4 is a block diagram showing the construction of the memory unit 4. The function of each block will be described in detail below by reference to FIG. 4.

<Memory Controller 43>

A memory controller 43 is constructed with a central processing unit (CPU) and logic circuits. The memory controller 43 receives a command from the system controller 1 and sets operational conditions therein based on the command. The memory controller 43 transmits state information indicating the state of the memory unit 4 to the system controller 1.

Operational commands from the system controller 1 include image input, image output, compression, decompression, and so forth. The image input command and the image output command are transmitted to an image I/O DMAC 41 (to be described later), and commands related to compression are transmitted to an image transfer DMAC 44 (to be described later), a code transfer DMAC 45 (to be described later), and a compression/decompression unit 46 (to be described later).

<Image I/O DMAC 41>

The image I/O DMAC 41 is constructed with a CPU and logic circuits. The image I/O DMAC 41 communicates with the memory controller 43, receives a command, and sets operational conditions thereof based on the command. The image I/O DMAC 41 transmits state information indicating the state thereof to the memory controller 43. In response to reception of an image input command, the image I/O DMAC 41 divides the input image data into memory data items each including data corresponding to eight pixels in accordance with the input image sync signal and outputs the memory data item to the memory controller 43 with a memory access signal. In response to reception of an image output command, the image I/O DMAC 41 outputs the image data from the memory controller 43 in synchronization with an output image sync signal.

<Image Memory 42>

An image memory 42 is a memory area where the image data are stored therein, and is constructed by semiconductor memory devices such as DRAM. For example, the memory capacity of the image memory 42 is 27 MB, a sum of 18 MB for storing binary image data of two A3-sized pages at a resolution of 600 DPI, and 9 MB for storing compressed data. The memory controller 43 controls the reading operation and the writing operation.

<Image Transfer DMAC 44>

An image transfer DMAC 44 is constructed by a CPU and logic circuits. The image transfer DMAC 44 receives a command from the memory controller 43, sets operational conditions based on the command, and transmits state information indicating the state thereof to the memory controller 43. In response to a compression command, the image transfer DMAC 44 outputs a memory access request signal to the memory controller 43. In the case where the memory access acknowledge signal is active, the image transfer DMAC 44 receives image data and transfers the image data to a compression/decompression unit 46 (to be described later). The image transfer DMAC 44 includes an address counter that increments in response to a memory access request signal and outputs a 22-bit memory address indicating the memory area where the converted image data are temporarily stored.

<Code Transfer DMAC 45>

A code transfer DMAC 45 is constructed with a CPU and logic circuits. The code transfer DMAC 45 communicates with the memory controller 43 so that the code transfer DMAC 45 receives a command, sets operational condition thereof in compliance with the command, and transmits status information indicating the state of the code transfer DMAC 45 to the memory controller 43. In response to a decompression command, the code transfer DMAC 45 outputs a memory access request signal to the memory controller 43. If the memory access acknowledgement signal is active, the code transfer DMAC 45 transfers the received image data to a compression/decompression unit 46 (to be described later). The code transfer DMAC 45 includes an address counter that increments in response to the memory access request signal, and outputs a 22-bit memory address of a memory area in which the converted image data are temporarily stored. The operation in which a DMAC accesses descriptors will be described later.

<Compression/Decompression Unit 46>

The compression/decompression unit 46 is constructed with a CPU and logic circuits, and communicates with the memory controller unit 43 so that the compression/decompression unit 46 receives a command, sets the operational condition thereof in compliance with the command, and transmits status information indicating the state thereof to the memory controller 43. The compression/decompression unit 46 converts binary data by the Modified Huffman coding method.

<HDD Controller 47>

An HDD controller 47 is constructed with a CPU and logic circuits, and communicates with the memory controller 43 so that it receives a command, sets its operational condition in compliance with the command, and transmits status information indicating, its state to the memory controller 43. The HDD controller 47 reads the status information of an HDD 48 and exchanges data with the HDD 48. This HDD controller 47 uses a descriptor method and can transmit compressed code data to the HDD 48.

<HDD 48>

The HDD 48 is a secondary storage apparatus such as a hard disk drive. This HDD 48 has a large capacity to store the compressed code data (transferred from a buffer region in the image memory 42 in which converted data are stored). In response to an instruction from the HDD controller 47, the HDD 48 stores code data (image data) therein, or retrieves code data stored therein.

Figure 5:
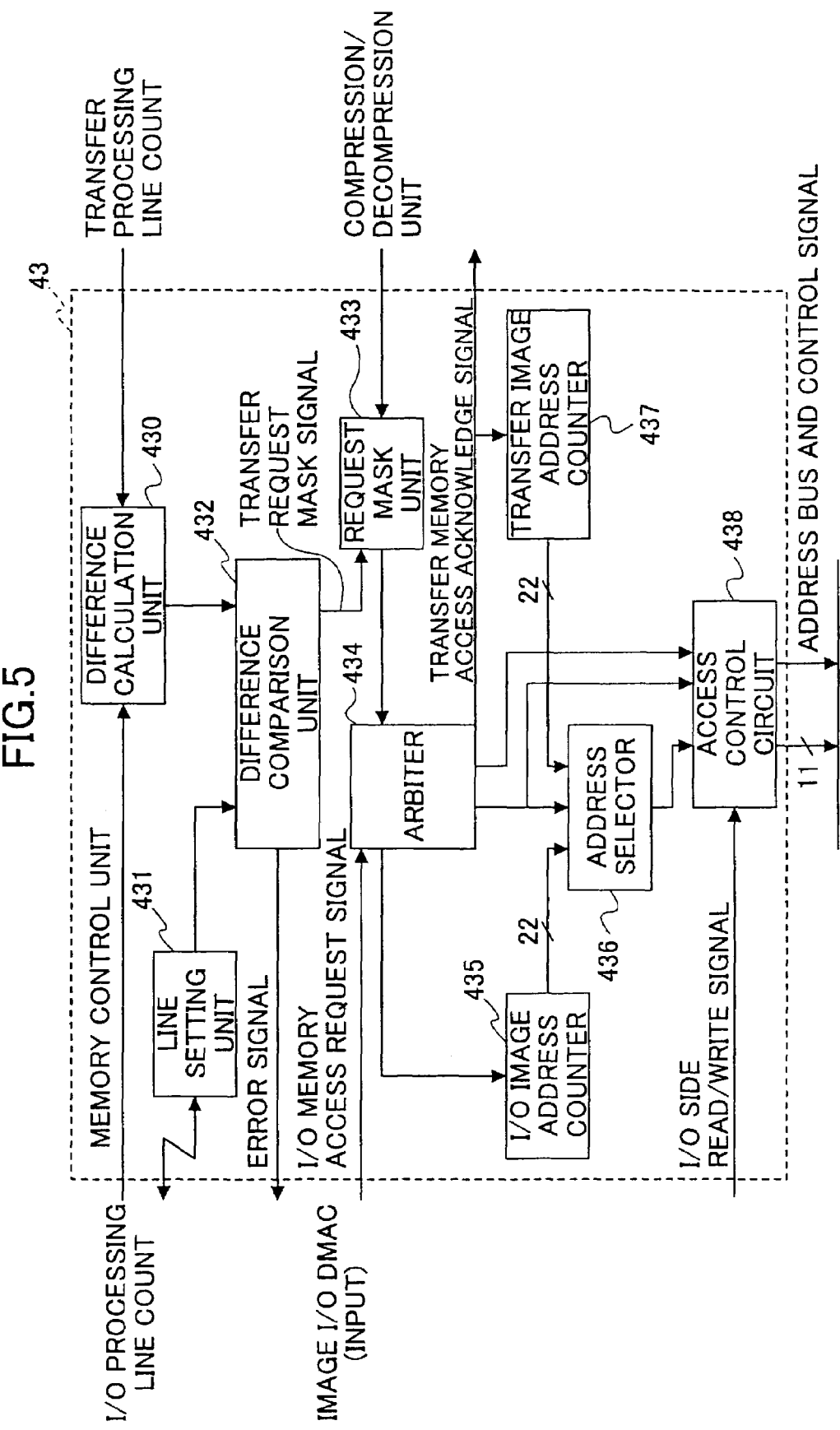
FIG. 5 is a block diagram showing the construction of a memory control unit that is a component of the memory unit of the digital copier of FIG. 1.

The internal construction of the memory controller 43 will be described in detail by reference to FIG. 5. A description will be given for each block showed in FIG. 5.

<I/O Image Address Counter 435>

An I/O image address counter 435 is an address counter that increments in response to an I/O memory access request signal from the image I/O DMAC 41. The I/O image address counter 435 outputs a 22-bit memory address of a memory region where image data to be input or output are stored. The address that the I/O image address counter 435 indicates is initialized when a memory access starts.

<Transfer Image Address Counter 437>

A transfer image address counter 437 increments in response to a transfer memory access acknowledge signal, and outputs a 22-bit memory address indicating a memory region in which image data to be transferred are temporarily stored. The memory address is initialized when the memory access is started.

<Line Setting Unit 431>

In the case where the image (semiconductor) memory 42 is used as an input buffer of an image, a line setting unit 431 sets a value with which the difference between an input processing line output from a difference calculation unit 430 (to be described later) and a transfer line is compared by a difference comparison unit 432 (to be described later). The system controller 1 sets the value as desired.

<Difference Calculation Unit 430>

When an image is input, the difference calculation unit, 430 subtracts the number of lines processed and output by the image I/O unit from the number of lines transferred and output from the compression/decompression unit 46, and outputs the result to the difference comparison unit 432.

<Difference Comparison Unit 432>

When an image is input, the difference comparison unit 432 compares the difference in the number of lines and the value set by the line setting unit. If the difference in the number of lines and the setting value match, the difference comparison unit 432 outputs an error signal. If the difference in the number of lines becomes 0, the difference comparison unit 432 turns a transfer request mask signal active to inform an arbiter 434 (to be described later) of the result of the comparison. In other cases, or when the I/O image address counter 435 is not in operation, the difference comparison unit 432 does not turn the transfer request mask signal active.

<Address Selector 436>

An address selector 436 is a selector to select, in response to a selection by an arbiter 434, either the address of the I/O image or the address of the transfer image.

<Arbiter 434>

The arbiter 434 arbitrates between memory access request signals from the image I/O DMAC 41, the image transfer DMAC 44, and the code transfer DMAC 45 and outputs an access acknowledgment signal. The arbiter 434 includes a refresh control circuit. When memory access is not active, the arbiter 434 outputs an active memory access acknowledgment signal to either the refresh control circuit, the image I/O DMAC 41, the image transfer DMAC 44, or the code transfer DMAC 45 in that order of priority. The arbiter 434 selects an address of the image memory 42 and outputs a trigger signal indicating the start of accessing memory to an access control circuit 438 (to be described later) as well as outputting the acknowledgment signal.

<Request Mask 433>

Depending on the result of comparison from the difference comparison unit 432, a request mask 433 masks (to set in a disable state) the transfer memory access request signal for accessing the compression/decompression unit 46 to terminate a transfer operation.

<Access Control Circuit 438>

Depending on a signal from the arbiter 434, the access control circuit 438 divides the input physical address into a corresponding row address and a corresponding column address of DRAMs that are semiconductor memory devices and outputs them to an 11-bit address bus. The access control circuit 438 also outputs DRAM control signals (RAS, CAS, WE) in response to an access start signal from the arbiter 434.

When image data are input and stored in the memory unit 4, the control unit 43 is initialized in response to an instruction from the system control unit 1 to input image data, and waits for image data to be input. Image data captured by the scanner of the image reading unit 20 are stored in the memory unit 4. The input image data are temporarily stored in the image (semiconductor) memory 42. The number of processed lines of the image data is counted by the image I/O DMAC 41 and input to the memory control unit 43. Though the compression/decompression unit 46 outputs a transfer memory access request signal in response to an image transfer command, the request mask unit 433 of the memory control unit 43 masks the transfer memory access request signal so as to make the transfer memory access request signal ineffective. When image data of one line are completely input, the mask of the transfer memory access request signal is discharged. The image data stored in the semiconductor memory 42 are retrieved, and the retrieved image data are transferred to the compression/decompression unit 46. While the image data are transferred, the difference calculation unit 430 calculates the difference between the numbers of processed lines, and the transfer memory access request signal is masked when the difference becomes zero to avoid the passing of the address (of the image data). As described above, the image data are transferred depending whether the image data are written in or read from the image memory 42.

The operation in which the image (video) I/O DMAC 41 accesses descriptors stored in the image (semiconductor) memory 42 and transfers image data to/from the image (semiconductor) memory 42.

Figure 6:
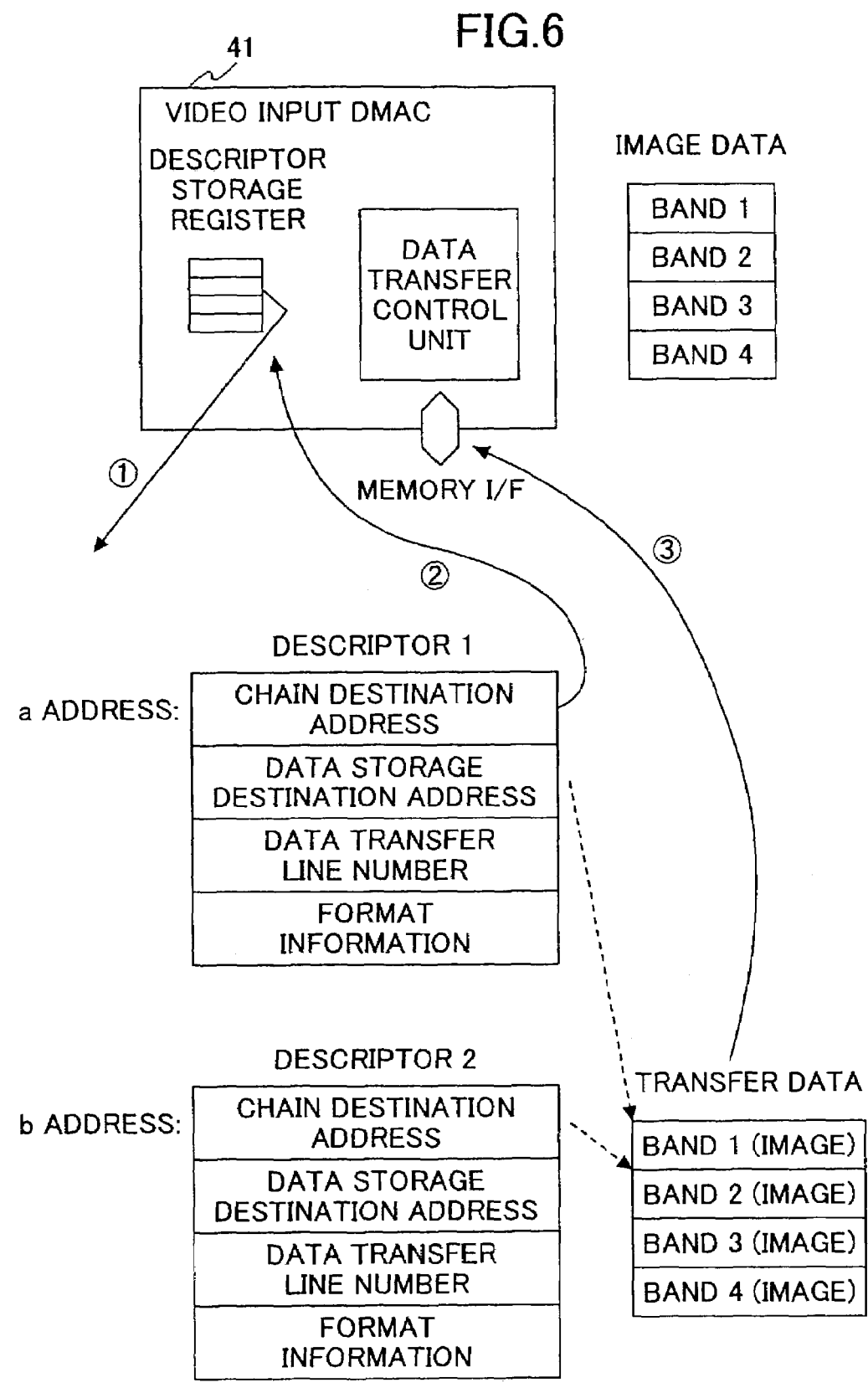
FIG. 6 is a schematic diagram for explaining a descriptor format and a transfer operation according to an embodiment of the present invention.

FIG. 6 is a schematic diagram for explaining the descriptor format and the transfer operation using the descriptor. The image data showed in FIG. 6 are divided into four bands. 1–4, and the image I/O DMAC 41 transfers the image data corresponding to the number of lines in compliance with instructions of the descriptors 1–4.

A procedure in which the total number of transferred lines of an image is obtained will be described below. In response to reception of a transfer command, the image I/O (video input) DMAC 41 is activated, reads a descriptor 1 in a chain destination address (a) set at an internal descriptor storage register by the CPU, and loads the contents of the descriptor 1 in the semiconductor memory 42 to the descriptor storage register. The following information is included in the loaded contents: a 4-word chain destination address indicating the address in which the next descriptor is stored, a data storage destination address indicating the top address to which data are transferred, a data transfer line number indicating the amount of transferred data as the number of lines, and format information indicating whether, when a designated number of lines has been transferred, to interrupt the CPU. The least significant bit of the format, information indicates whether a CPU interrupt is to be generated or not in the case where the designated number of lines has been transferred. If "1", the CPU interruption is generated, and if "0", the CPU interruption is masked.

In the example illustrated in FIG. 6, an image is divided into four bands, and the least significant bit of each of four descriptors is set at "1". When the image data of each band is completely transferred, a CPU interrupt is generated. In response to the generation of the interrupt, the image I/O DMAC 41 transfers an image to the image memory 42 by increasing the number of lines. The image I/O DMAC 41 determines when to stop the data transfer by adding the data transfer line number provided in each descriptor. In addition, the image memory 42 provided as the primary storage unit out of a buffer region of input images transferred by the image (video) input DMAC 41 is also used as a storage region in which compressed data transferred by the code transfer DMAC 45 through the compression/decompression unit 46 are stored.

As described above, after an input image is temporarily stored in the image (semiconductor) memory 42 by the image (video) input DMAC 41, this input image is transferred to and stored in the HDD 48 provided as the secondary storage unit. In this embodiment, the input image is compressed, and the compressed image data are stored in the secondary storage unit. For this purpose, the input image temporarily stored in the image memory 42 is provided to the compression/decompression unit 46 using the descriptor (one descriptor in which the known number of lines of an image to be transferred is set) in the image transfer DMAC 44, and compressed therein. The converted data (intermediate image data) that have been compressed and encoded are transferred to a buffer region provided in the image memory 42 in accordance with the descriptor set in the code transfer DMAC 45. The amount of codes counted by the code transfer DMAC 45 shows the converted data.

Afterwards, the data transferred to the buffer region provided in the image memory 42 to store the compressed converted data are further transferred from the buffer region to the HDD 48 by the HDD controller 47 in compliance with a command received from the memory control unit 43, and stored therein.

The amount of data transferred to the buffer memory secured in the image memory 42 determines the memory capacity to be secured in the HDD 48.

Next, the method of controlling the operation of data transfer from the inputting of an image to the storing of the image, according to an embodiment of the present invention, will be described in detail.

An embodiment related to a data transfer to the primary storage unit will be described first.

As described above, the input image data are compressed and temporarily stored in a buffer region in the primary storage unit, and then, transferred to the secondary storage apparatus such as the HDD 48. The memory capacity of the buffer region provided in the primary storage unit is basically determinable arbitrarily. For example, it is possible to secure a buffer region for an image and to transfer the image to a continuous region secured in the HDD 48 in a block. It is also possible to obtain a region in the HDD 48 and to transfer the image to a plurality of s divisional regions secured in the HDD 48.

In order to effectively manage the memory regions of the primary memory unit (image memory 42), and secure and release the memory regions, three management tables, "an image ID table", "a descriptor table", and "a block table" are used.

The "image ID table" will be described first.

Figure 7:
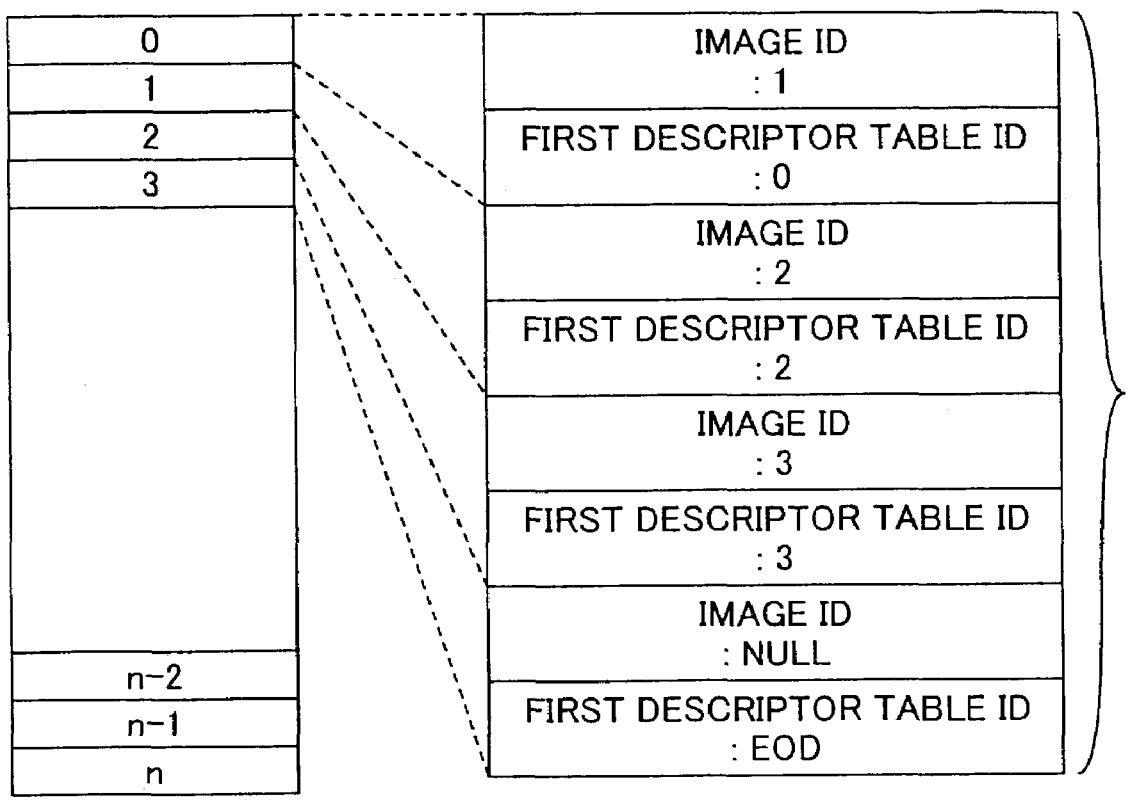
FIG. 7 is a schematic diagram showing an image ID table according to an embodiment of the present invention, which is used to secure and release a memory region of an HDD.

FIG. 7 is a memory map showing an image ID table that is used to secure and release a memory region in the image memory 42 by the memory control unit 43.

Each row of this image ID table is assigned a table ID 0–n and includes an image ID and an initial descriptor table ID.

The image ID is a unique ID (identification information) in the image memory (primary memory unit) 42 and the HDD (secondary memory apparatus) 48, and any image ID of different image data must be different. The image ID "0" (null) is reserved to indicate the initial state of the image ID table and cannot be used elsewhere.

The initial descriptor table ID is the first descriptor table ID that is obtained. In the initial state, the image ID is set at null, and the initial descriptor table ID is set at EOD (End Of Descriptor).

Next, the "descriptor table" will be described below.

Figure 8:
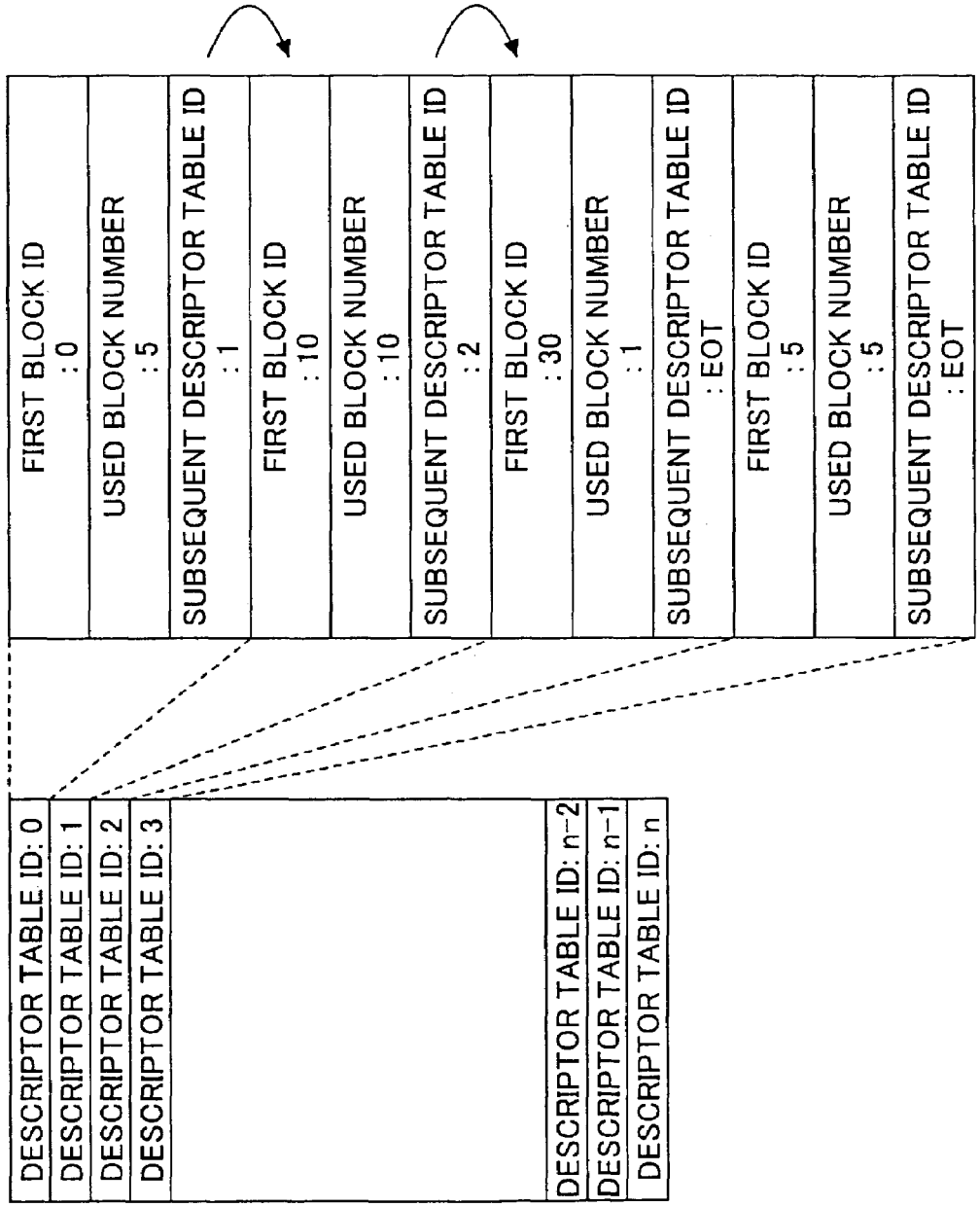
FIG. 8 is a memory map showing a descriptor table according to an embodiment of the present invention, which is used to secure and release a memory region of an HDD.

FIG. 8 is a memory map showing the descriptor table that is used to secure and release a memory region of the image memory 42 by the memory control unit 43.

Each item of the descriptor table has a table ID 0–n assigned thereto, and includes an initial block ID, a used block number, and a subsequent descriptor table ID.

The initial block ID means the block ID that is obtained first. The used block number means the number of blocks that are continuously secured from the initial block.

The subsequent descriptor table ID is used, in the case where a continuous memory region of the HDD 48 is not available, to manage the divisional memory regions combined like a chain (chain structure).

A descriptor of which the initial block ID is an "EOB" (End Of Block) code is determined to be an unused descriptor. A descriptor is determined to be the end of a chain if its subsequent descriptor table ID is an "EOT" (End of Table) code.

In the initial state of the descriptor table, the initial block is set at "EOB," the used block number is set at "0" and the subsequent descriptor table ID is set at "EOT".

The "block table" will be described below.

Figure 9:
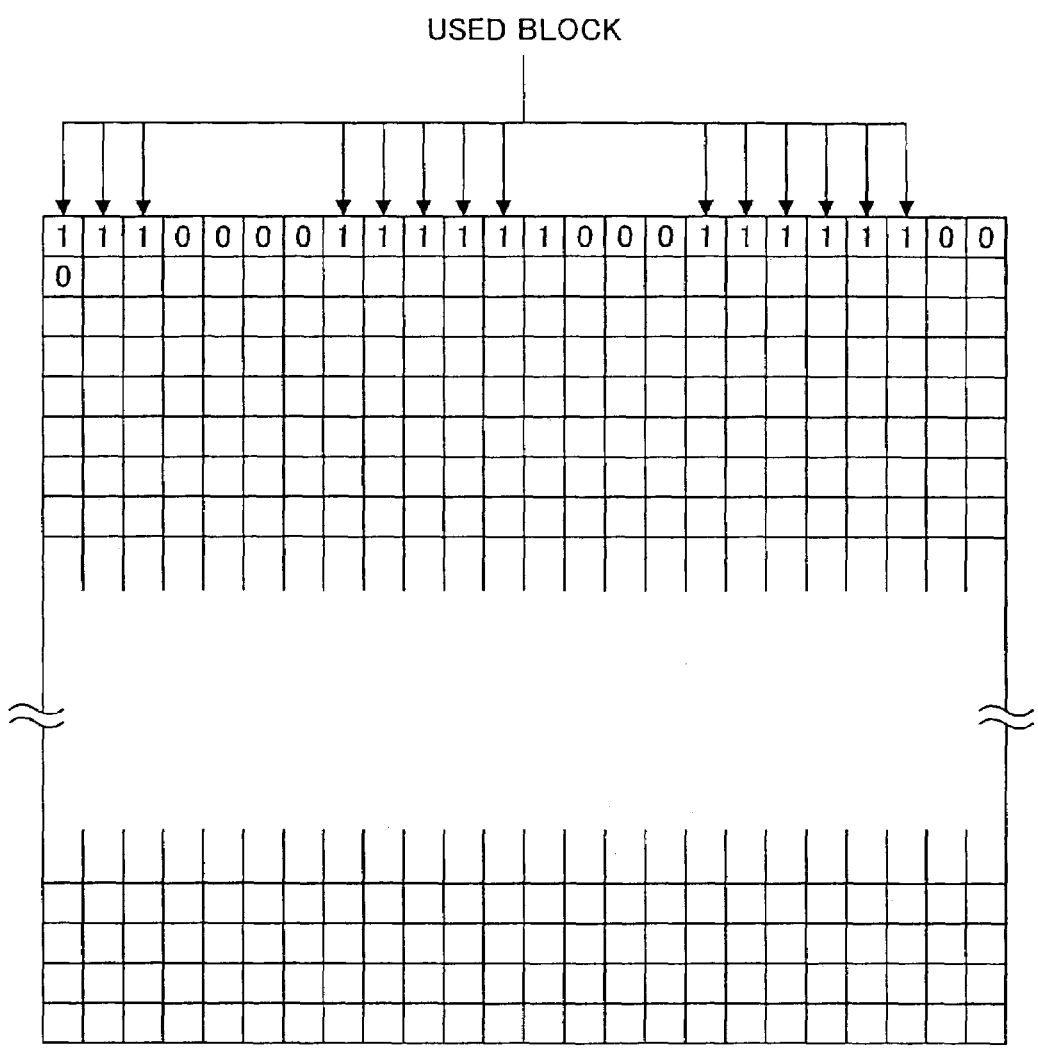
FIG. 9 is a memory map showing a block table according to an embodiment of the present invention, which is used to secure and release a memory region of an HDD.

FIG. 9 is a memory map showing a block table that is used to secure and discharge a storage region in the image memory 42 by the memory control unit 43.

The storage region of the HDD 48 is divided into fractions of a fixed length (hereinafter, a fraction having a unit memory size is referred to as a "block"). Whether a block is used is indicated by a bit that becomes "0" if the block is used, and "1" if the block is not used. The state of the memory region where the compressed image is stored is managed by this block table.

In the case where the memory region of 9 MB is secured as the image memory 42 as described above, and the fixed block size is 4 KB, for example, the number of blocs is:

9,216 (KB)/4 (KB)=2,304 (Blocks).

Since one bit is required for each block, 2304 bits in total are required for the block table. In the initial state, all bits are set at "0" (indicating an unused state).

Since one item of image data requires one image ID table, one descriptor table, and one block, the image ID tables and the descriptor tables as many as blocks suffice even in the maximum case.

An embodiment in which a continuous region or divisional regions are secured and a memory region is obtained to temporarily store input image data (including converted data after compression) in the memory region of the image memory 42 managed by the above "image ID table", "descriptor table", and "block table".

The operational unit 7 is used to determine whether the data storage region of the image memory 42 is to be secured as a continuous region or divisional (discontinuous) regions.

Figure 10:
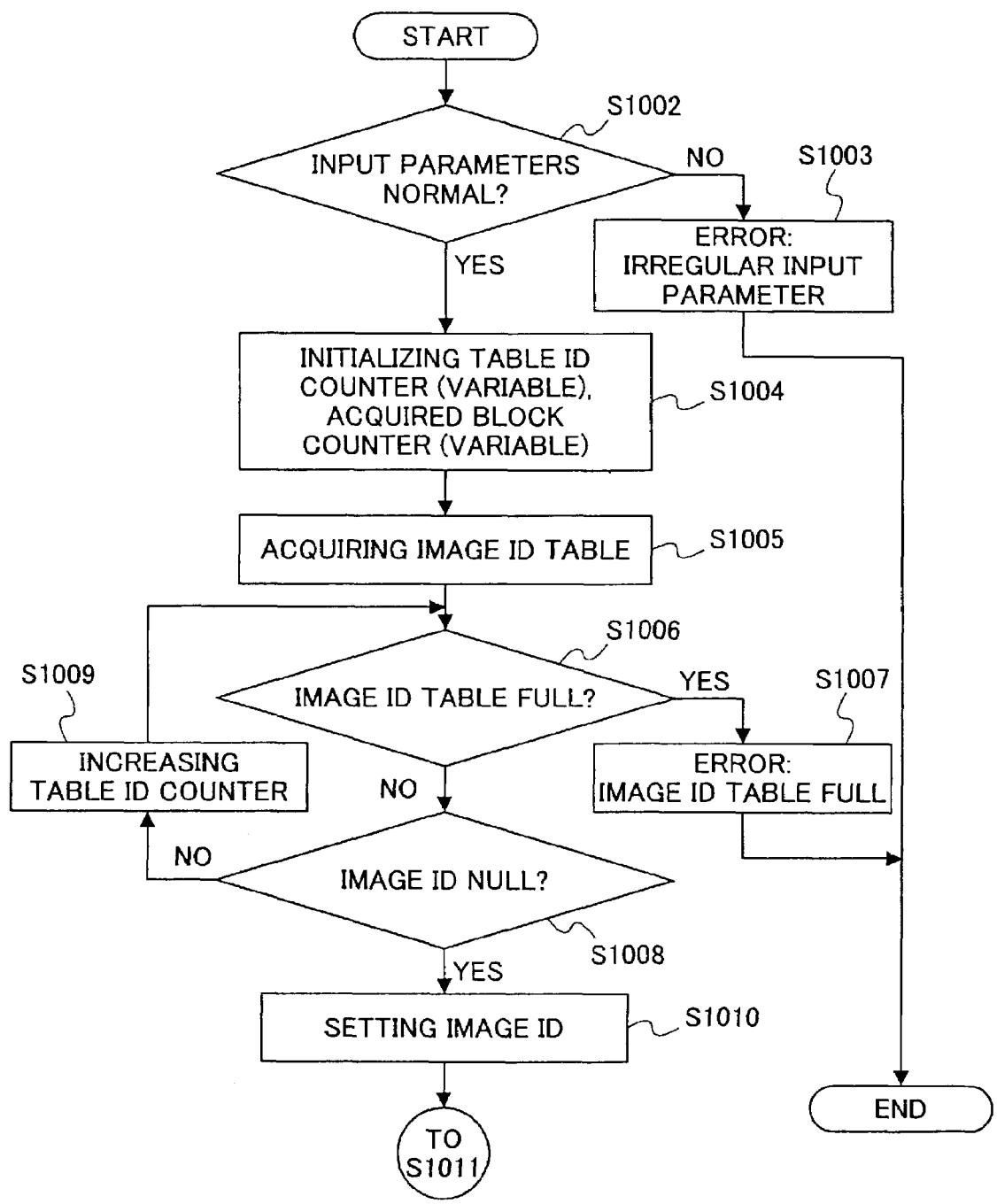
FIG. 10 is the first part of a flow chart showing an operation in which a memory region is secured by a memory control unit according to an embodiment of the present invention.
Figure 11:
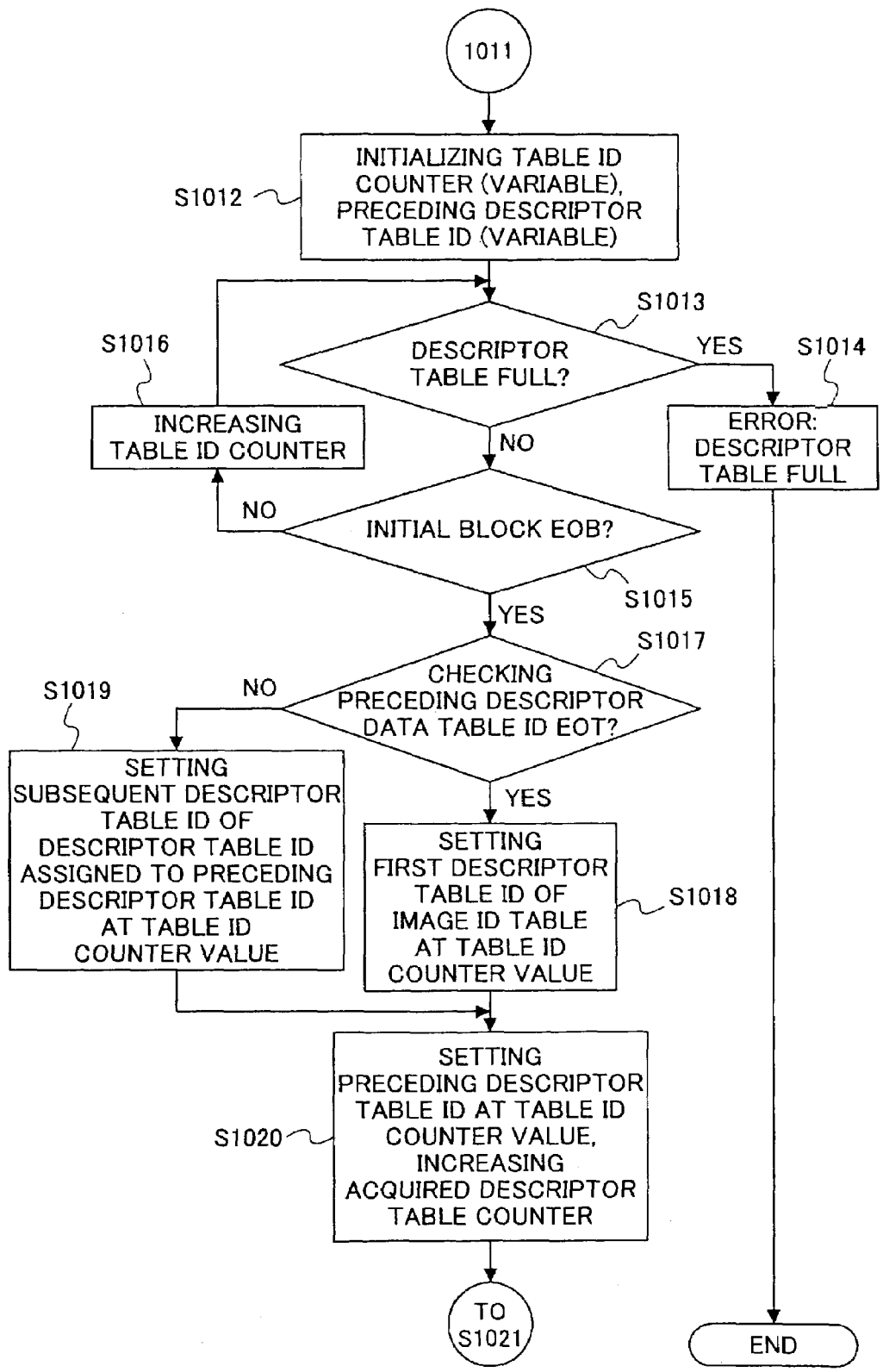
FIG. 11 is the second part of the flow chart showing an operation in which a memory region is secured by the memory control unit.
Figure 12:
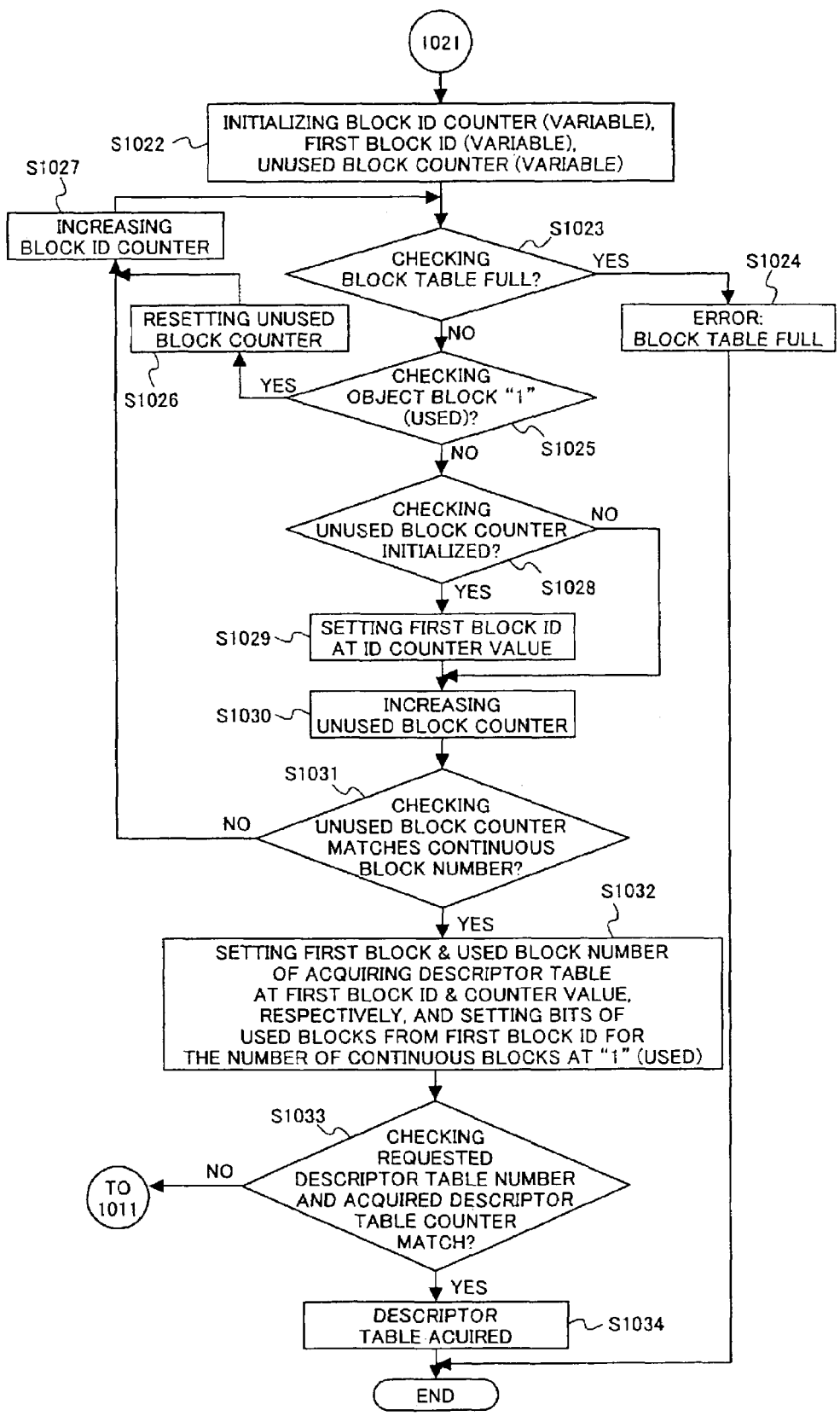
FIG. 12 is the third part of the flow chart showing an operation in which a memory region is secured by the memory control unit.

FIGS. 10–12 are flow charts showing the operation in which the memory control unit 43 secures the continuous memory region or the divisional memory regions of the image memory 42 depending on the above determination. This embodiment will be described by reference to FIGS. 10–12.

In response to a request to secure a memory, region, this process is activated. The following items are to be input first: the image ID, a continuous block number designating the continuity of the blocks to be secured, and a descriptor table number that enables a plurality of continuous block numbers to be designated. The memory control unit 43 checks whether there is any irregularity in the parameters indicating these input values (S1002). If any irregularity is found (No branch of S1002), the memory control unit 43 issues "irregular input parameter" (S1003) and terminates the process.

Next, the memory control unit 43 initializes a table ID counter, which is a counter that designates an image ID table, and an obtained block table counter by assigning them "0" (S1004). The memory control unit 43 obtains the image ID table (S1005).

The memory control unit 45 loop-searches for a table the image ID of which is a null value from the top of the image ID table. In the case where the table ID counter is found to be the last table ID in the loop search, it means that all the table IDs are used. The memory control unit 45 checks whether the table ID count is full (S1006). If the table ID count is full, the memory control unit 45 determines that no image ID table is obtainable, and issues a message "image ID table full" as an irregular process (S1007). The process is terminated.

In the case where the table ID count is not full and an image ID is available (No branch of S1006), the memory control unit 43 increases the table ID counter and loop-searches for an image ID table (S1009) until the table ID count becomes a null value, that is the memory control unit finds an unused image ID table (Yes branch of S1008). As a result, if an unused image ID table is found (Yes branch of S1008), the memory control unit 43 sets the image ID of the object image ID table at a requested image ID (S1010).

Next, the memory control unit 43 obtains a descriptor table. At first, the memory control unit 43 sets the table ID counter (a counter designating a descriptor table) that is required to obtain a descriptor at "0" and further sets the preceding descriptor table ID (variable) at EOD to initialize the counters (S1012).

The memory control unit 43 loop-searches for a descriptor table the initial block of which is EOB from the top of the descriptor tables. In the case where the table ID counter becomes the last table ID value in the loop search, it means that all of the descriptor tables are used. The memory control unit 43 checks whether the table ID count is full (S1013). If the table ID count is full, the memory control unit 43 determines that no descriptor table is obtainable, and the memory control unit 43 returns a message "descriptor table full" indicating the irregularity (S1014). Then, the process is terminated.

In the case where the table ID count is not FULL, that is, a descriptor table is available (No branch of S1013), the memory control unit 43 loop-searches for a descriptor table by increasing the table ID counter (S1016) until the memory control unit 43 finds a descriptor table the initial block of which is EOB, that is, a descriptor table that is not in use (Yes branch of S1015).

As a result, if an unused descriptor table is found (Yes branch of S1015), the memory control unit 43 determines whether the preceding descriptor table ID is EOT, and follows different processes. If the preceding descriptor table ID is EOT (Yes branch of S1017), the memory control unit 43 determines that the descriptor table is the first one, and sets the initial descriptor table ID of the obtained image ID table (see S1010 for reference) at the searched descriptor table ID (counter value). On the other hand, in the case where a value other than EOT is assigned to the preceding descriptor table ID (No branch of S10107), the memory control unit 43 sets the subsequent descriptor table ID of the descriptor table designated by the preceding descriptor table ID (S1019).

Since a descriptor table has been obtained, the memory control unit 43 sets the preceding descriptor table ID (variable) at the table ID counter value obtained in the preceding step and increments the obtained descriptor table counter (S1020).

Last, the memory control unit 43 obtains blocks by reference to the block table. The memory control unit 43 searches for a bit "0" (indicating an unused block) by checking the block table from the top thereof.

All variables "block ID counter", which is required to obtain a block, "first block ID", and "unused block counter" are initialized and set at "0" (S1022).

In the case where the block ID counter indicates the last block ID value (FULL), all blocks are used. The memory control unit 43, checks whether the block ID counter is FULL (S1023).

If the block ID counter is FULL (Yes branch of S1023), the memory control unit 43 determines that no block is available, and issues a signal indicating an irregular condition in which the block table is full (S1024). The process is terminated.

If the block ID counter is not FULL (No branch of S1023), the memory control unit 43 checks whether the bit in the block table corresponding to the block identified by the block ID counter (object block) indicates "1" (used) (S1025).

If the bit of the object block is "1" (used) (Yes branch of S1026), the number of unused blocks in series is not sufficient to buffer the image data. The memory control unit 43 resets the "unused block counter" (S1026). The memory control unit 43 increases "block ID counter" by one, and returns to step S1023 to check the next object block.

If the bit of the object block is "0" (unused) (No branch of S1025), the memory control unit 43 checks whether the "unused block counter" is initialized, that is, "0" (S1028).

If the "unused block counter" is "0", which means that the object block is the first block of unused blocks in a series, the memory control unit 43 assigns the value of "block ID counter" indicating the object block to "first block ID" (S1029). Then, the memory control unit 43 increases the unused block counter by one (S1030).

If the unused block counter is not initialized, and the object block is not the first block of unused blocks in a series (No branch of S1028), step S1029 is skipped.

After increasing the unused block counter by one, the memory control unit 43 determines whether the unused block counter has reached the number of blocks in a series required to buffer the image data (S1031). That is, the memory control unit 43 checks whether blocks sufficient in number to buffer the image data are secured.

If blocks sufficient in number to buffer the image data have not been secured (No branch of S1031) the memory control unit 43 increases the block ID counter by one (S1027) and returns to step S1023 to check the next object block.

If the blocks sufficient in number to buffer the image data have been secured (Yes branch of S1031), the memory control unit 43 inserts the current values of the first block ID and the unused block counter to the first block and the used block number, respectively, of the descriptor currently acquired. The memory control unit 43 turns the bit of the object block to "1", which indicates that the, block is used. (S1032).

Then, the memory control unit 43 compares the number of required descriptors and the value of the secured descriptor table counter (S1033). If they match, the memory control unit 43 determines that required descriptors have been secured, and sends a signal indicating that the process to secure the descriptors has been completed (S1034). The process is terminated.

If the number of required descriptors and the value of the secured descriptor table counter do not match, the memory control unit 43 returns to step S1011 to acquire the next descriptor.

A memory region to temporarily store the image data therein is secured as described above. The process in which the secured memory region is discharged will be described below. The memory region secured in the primary memory unit (image memory 42) is a buffer that is to be discharged, after the image data are transferred to the secondary storage apparatus, in order to store the next image data.

Figure 13:
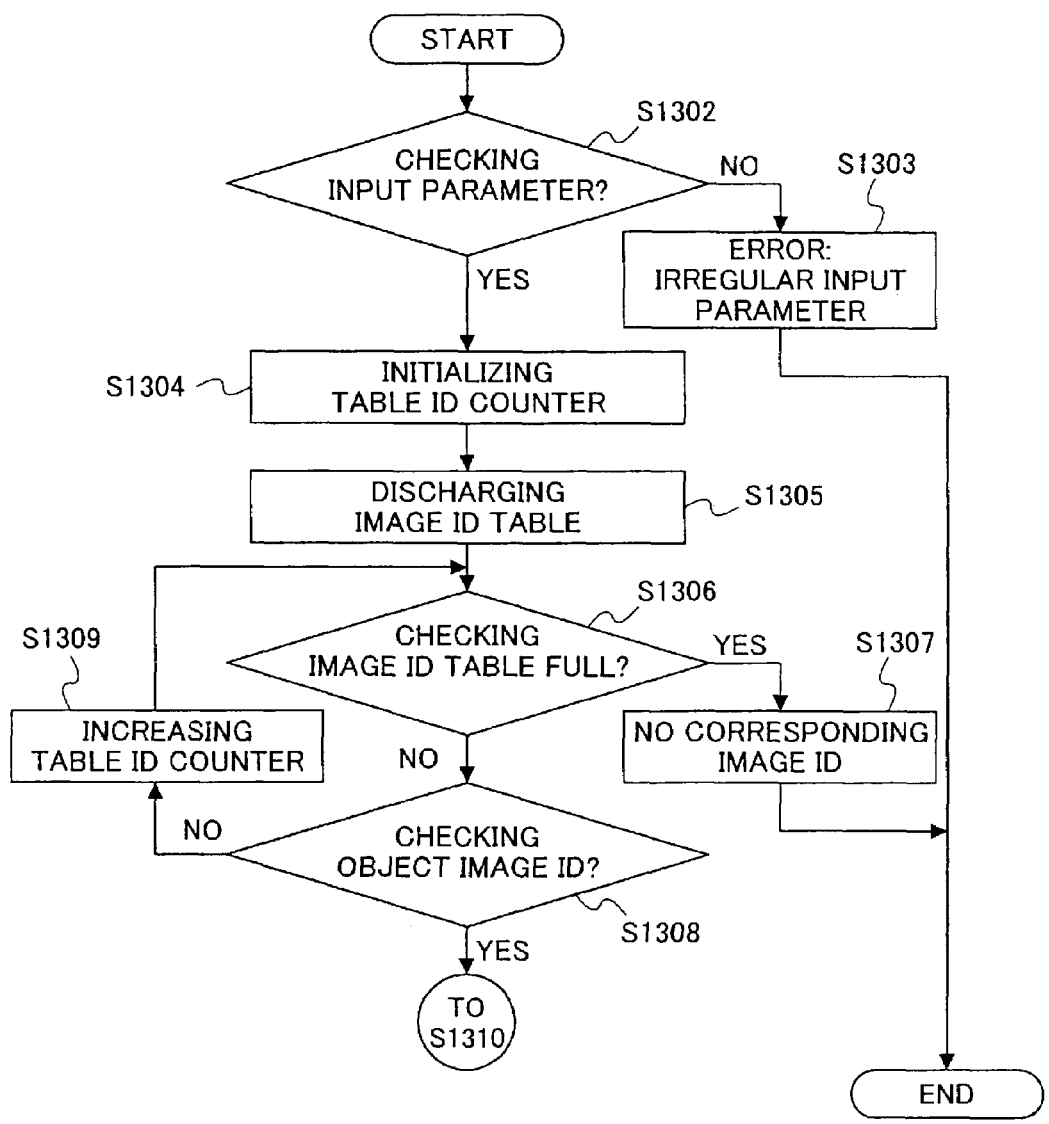
FIG. 13 is the first part of a flow chart showing an operation in which the memory region is released by the memory control unit according to an embodiment of the present invention.
Figure 14:
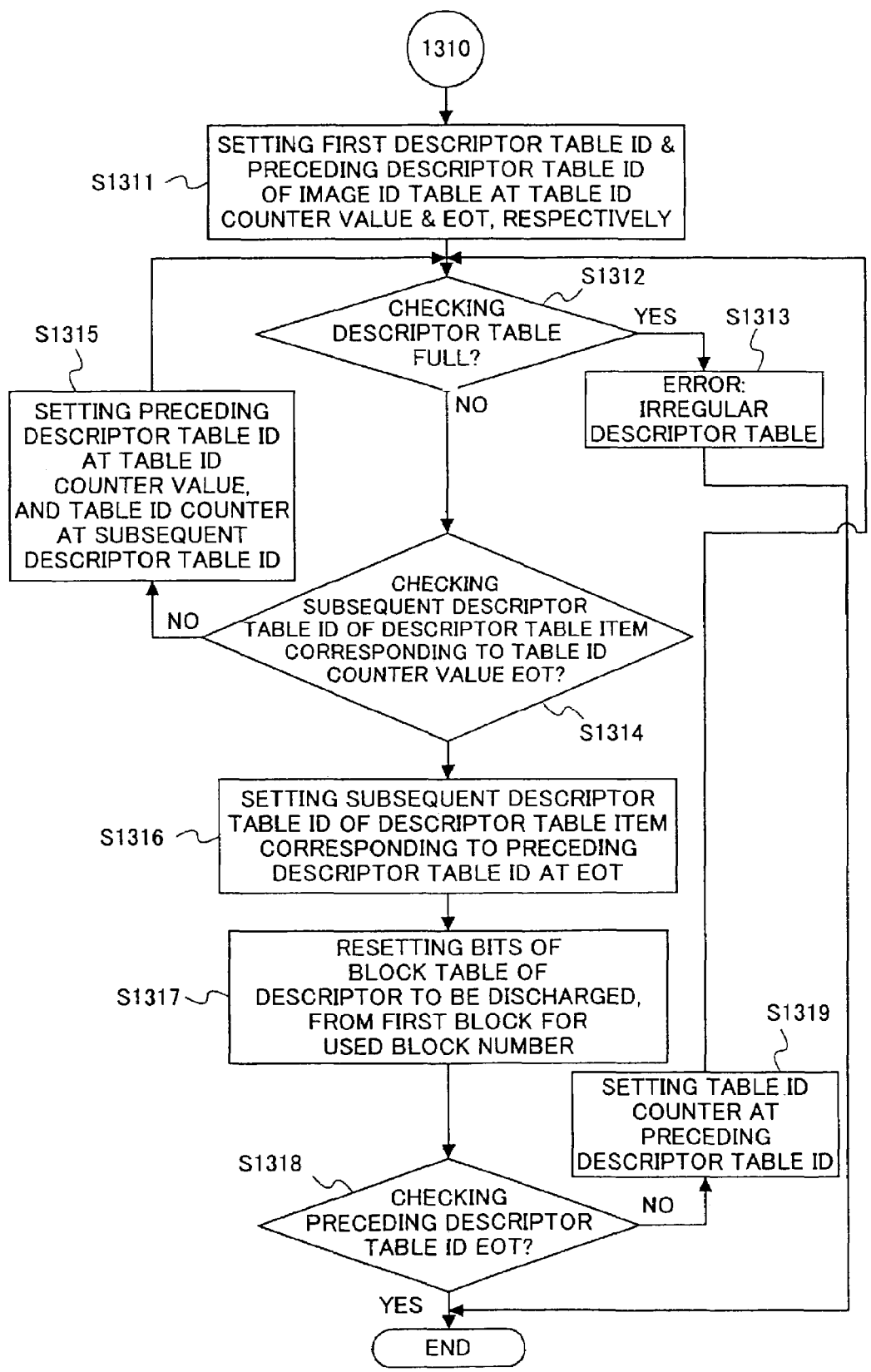
FIG. 14 is the second part of a flow chart showing an operation in which the memory region is released by the memory control unit.

FIGS. 13 and 14 are flow charts showing the process in which the memory control unit 43 discharges the secured memory region of the image memory 42.

As showed in FIGS. 13 and 14, in response to reception of a discharge request, the memory control unit 43 activates this process. The memory control unit 43 receives an image ID as an input parameter, and checks whether the input parameter is normal (S1302). If the input parameter is irregular (No branch of S1302), the memory control unit 43 returns a signal indicating that the input parameter is irregular (S1303) and terminates the process.

If the input parameter is regular (Yes branch of S1302), the memory control unit 43 initializes the table ID counter indicating the image ID table by assigning "0" (S1304) and searches the image ID table (S1305).

The memory control unit 43 searches for an image ID item in the image ID table that matches the input parameter (object image ID) until such an image ID item is found. In the case where the table ID counter reaches the last table ID value, which means that no table ID is found (S1306), the memory control unit 43 determines that no image ID table is available if the table ID count is FULL, and terminates the process by issuing a signal indicating that corresponding image ID table is not found (S1307).

If the table ID count is not full (No branch of S1306), that is, the corresponding image ID is found, until the table ID count matches the object image ID (Yes branch of S1308), the memory control unit 43 increases the table ID counter by one (S1309). As a result, in the case where an image ID table that corresponding to the object image ID is found (Yes branch of S1308), the memory control unit 43 moves to the next step to discharge the descriptor table and the block table.

In order to discharge descriptors that have been used for the image ID to be discharged, the memory control unit 43 searches for the last descriptor by looking for a descriptor of which "subsequent descriptor table ID" is EOT. Since the descriptor table is chain-structured ass described by reference to FIG. 8, the last descriptor must be first discharged.

At first, the memory control unit 43 sets the "first descriptor table ID" input in the image ID table to the "descriptor table ID counter", and sets EOT to the "preceding descriptor table ID" (S1311). The memory control unit 43 loop-searches for the descriptor table using the "descriptor table ID counter". In the case where the memory control unit 43 cannot find the table that is looked for (to be checked in step S1314) until the descriptor table ID counter becomes the last table ID value (FULL) (Yes branch of S1312), the memory control unit 43 determines that the descriptor table is damaged, sends a signal indicating the irregularity of the descriptor table (S1313), and terminates the process.

As a result of the loop-search of the descriptor table, in the case where the subsequent descriptor table ID indicated in the descriptor corresponding to the table ID counter value is other than EOT (No branch of S1314), the memory control unit 43 sets the preceding descriptor table ID to the value indicated by the current table ID counter, and then, the memory control unit 43 sets the subsequent descriptor table ID to the table ID counter (S1315). The memory control unit 43 repeats the steps S1312 and S1314.

In the case where the subsequent descriptor table ID of the descriptor corresponding to the table ID counter value is EOT, the subsequent descriptor table ID indicated in the descriptor table corresponding to the preceding descriptor table ID is set at EOT (S1316).

Since the descriptor table IDs to be discharged are determined in the steps described above, the blocks are discharged next (S1317). The blocks are discharged by setting "0" indicating that the corresponding block is not used, to bits of which the first block and the number of the blocks are indicated by the first block ID and the used block number indicated in the descriptor tables to be discharged.

As described above, the descriptor tables are discharged. Since descriptor tables are discharged one by one, in the case where a plurality of descriptor tables are chained, the subsequent descriptor table needs to be discharged. The memory control unit 43 refers to the preceding descriptor table ID and checks whether it is set at EOT (S1318). If EOT is set, the memory control unit 43 determines that all of the descriptor tables and the block table corresponding to the image have been discharged, and terminates the process (Yes branch of S1318 ). On the other hand, if EOT is not set, the memory control unit 43 sets the preceding descriptor table ID to the table ID counter to discharge the subsequent descriptor table (S1319), and returns to step S1312. The memory control unit 43 further discharges the descriptor table until the memory control unit 43 reaches the descriptor table to which EOT is set from the last table in the opposite order.

The process in which a memory region in the primary memory unit is secured and discharged was described above. The process in which a memory region in the secondary storage apparatus (HDD 48) is secured and discharged will be described next.

The compressed data transferred to the buffer region secured in the image memory 42 are further transferred to the HDD 48 and stored therein. The memory region to be secured in the HDD 48 depends on the buffer region secured in the image memory 42. For example, it is possible to secure a continuous memory region in the HDD 48 and continuously transfer an entire image stored in a buffer region of the image memory 42. It is also possible to secure divisional memory regions in the HDD 48 and divisionally transfer an image divisionally stored in divisional buffer region of the image memory 42.

The memory region of the secondary storage apparatus can be secured and discharged in the same manner in which a memory region of the primary memory unit is secured and discharged. Since the data structure showed in FIGS. 7–9 is used in the same manner, a description of the process is omitted here.

It is noted that, since the memory capacity of the secondary storage apparatus is substantially larger than that of the primary memory unit, a unit block of fixed size is formed by a plurality of sectors having successive logical addresses. The unit memory of a disk-shaped memory medium is called a sector. Data are stored and retrieved by sector.

The next embodiment relates to a simultaneous transfer of a plurality of images.

A transfer control unit according to the next embodiment can simultaneously transfer a plurality of images at even higher efficiency. In the case where a plurality of images are simultaneously transferred to a memory region of the secondary memory apparatus (HDD 48), the plurality of images are transferred divisionally in a plurality of transfer operations. In the case where a single image is transferred, the image is transferred in a single transfer operation.

Figure 15:
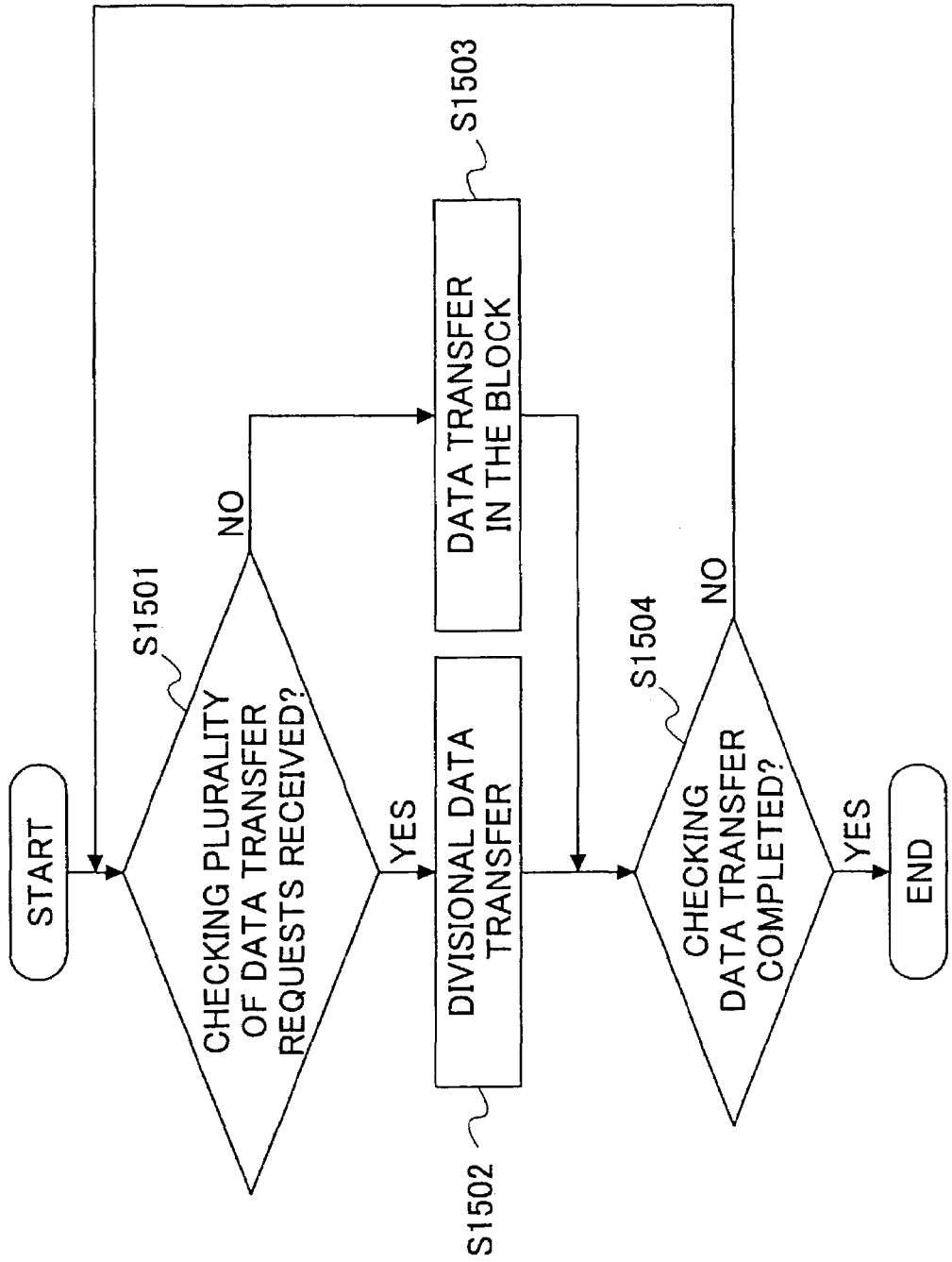
FIG. 15 is a flow chart showing an operation according to an embodiment of the present invention, in which either a block transfer or a divisional transfer is selected depending on whether a plurality of requests for data transfer are received.

FIG. 15 is a flow chart showing a transfer operation in which divisional transfers or a transfer in a block is selected depending on the situation of image data storage request and image data retrieval request.

Referring to FIG. 15, the operation of this embodiment will be described. In response to the setting through the operational unit 7, the system control unit 1 requests the memory control unit 43 to transfer data (input/output), and the memory control unit 43 begins transferring the image data in compliance with the request. The memory control unit 43 may receive another request to transfer data (input/output) before performing the first data transfer or in the middle of the first data transfer, that is, the memory control unit 43 may receive a plurality of requests to transfer data. The memory control unit 43 first checks whether a plurality of requests to transfer data are received to perform different operations depending on whether a plurality of requests have been received (S1501).

In the case where a plurality of transfer requests are received (Yes branch of S1501), an item of an image (a unit image) is divided into a plurality of fractions and each fraction is transferred to the HDD 48 (secondary memory unit) through the buffer region of the image memory 42 (primary memory unit) one by one (S1502).

In the case where only one transfer request is received (No branch of S1501), a unit image (an item of an image) as a whole is transferred at once to the HDD 48 through the buffer region of the image memory 42 (S1502).

Whichever the transfer in a block or the divisional transfers are performed, the memory control unit 43 checks whether the data transfer has been completed in a certain interval (S1504) in order to check whether a plurality of data transfer requests have been received until then, that is, whether an additional data transfer request has been received during the data transfer. If the data transfer has not been completed (No branch of S1504), the memory control unit 43 returns to step S1501 in which the memory control unit 43 checks whether it has received a plurality of data transfer requests (input/output), and the memory control unit 43 selects one of the data transfer operations.

If the data transfer has been completed (Yes branch of S1504), the memory control unit 43 terminates the process.

Each of the data transfer operations selected depending on whether a plurality of data transfer requests have been made will be described in detail below.

In these operations, the memory control unit 43 secures and discharges a memory region in each of the primary memory unit and the secondary memory unit as described above, and stores compressed image data to the secondary memory unit (HDD 48) through the buffer region in the primary memory unit (image memory 42).

Using the technique described above, since the memory control unit 43 can secure a memory region of any size in each of the memory units, the memory control unit 43 can transfer the image data in a block from the image memory 42 to the HDD 48, and it also can transfer the image data divisionally. In the case where an item of image is divisionally transferred, the memory control unit 43 secures a memory region of a fixed capacity in the image memory 42, and stores the image data compressed by the compression/decompression unit 46 in the buffer region of the image memory 42. The memory control unit 43 then secures a memory region in the HDD 48, the memory region being as large as the compressed image data stored in the buffer region, and transfers the compressed image data from the buffer region to the HDD 48. This operation is repeated until all the image data are completely transferred. The memory control unit 43 can improve the efficiency of the data transfer by securing a continuous memory region in the case of data transfer in a block and by securing memory regions of appropriate memory size in the case of divisional data transfers. Accordingly, the memory control unit can use the image memory 42 and the HDD 48 at a high efficiency.

An embodiment of the present invention in which a unit image is transferred from the image memory 42 to the HDD 48 in a block and an embodiment of the present invention in which a unit image is divisionally transferred will be described below.

Figure 16:
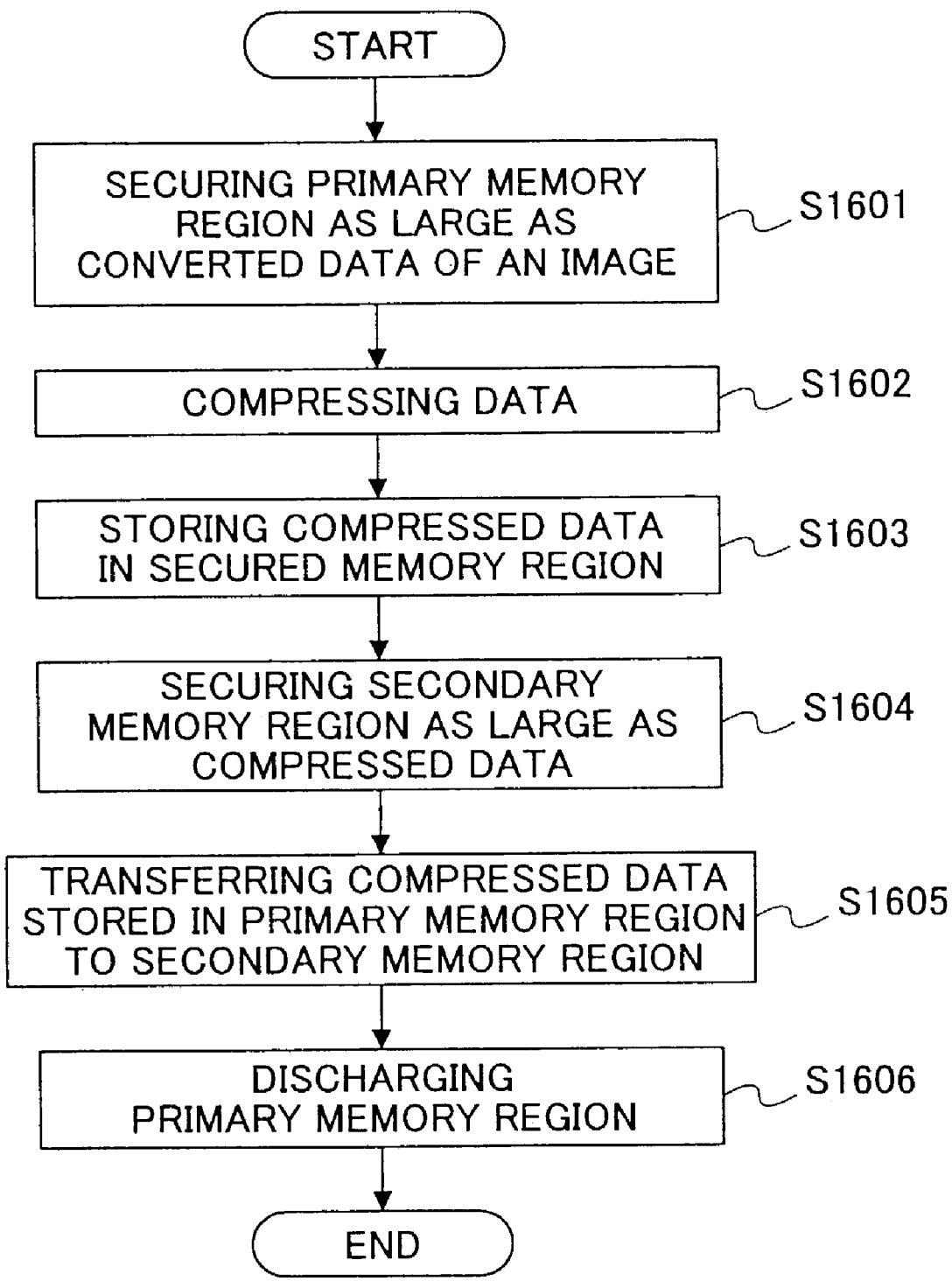
FIG. 16 is a flow chart showing an operation according to an embodiment of the present invention, in which image data stored in an image memory are transferred to an HDD in a block.

FIG. 16 is a flow chart showing a control operation in which a unit image is transferred in a block from the image memory 42 to the HDD 48.

As showed in FIG. 16, in response to an instruction from the system control unit 1, the memory control unit 43 secures a buffer region in the image memory 42, the memory capacity of which is large enough to store data of the compressed unit image (S1601). In the case where the size of the unit image may be decreased less than expected by the compression by the compression/decompression unit 46 due to a property of the compression/decompression unit 46, the memory control unit 43 needs to secure the additional memory size as well.

The memory control unit 43 activates the compression/decompression unit 46 to compress the data of the unit image (S1602), and stores image data of the unit image in the buffer region in the image memory 42 secured in step S1601 (S1603). In this embodiment, the data transfer is performed as follows.

First, the input image stored in the image memory 42 is transferred to the compression/decompression unit 46 using descriptors provided to the image transfer DMAC 44, and compressed there. Next, the image data compressed and encoded by the compression/decompression unit 46 are transferred to the buffer region in the image memory 42 using descriptors provided to the code transfer DMAC 45. The DMA transfers using descriptors are performed in the same manner as described by reference to FIG. 6.

After storing the encoded image data in the buffer region, the memory control unit 43 sends a command to cause the HDD controller 47 to secure a memory region in the HDD 48 as large as the encoded image data (S1604). The size of the encoded image data is known since it is measured when the image data are compressed and encoded. The memory region that fits the encoded image data in size can be secured by setting the encoded image data size to the HDD 48 as the memory size to be secured. Because the encoded image data are transferred in a block, the memory control unit 43 needs to secure a continuous memory region in the HDD 48. The setting is made through the operational unit 7.

After securing the continuous memory region, the encoded image data are transferred from the buffer region of the image memory 42 to the continuous memory region secured in the HDD 48 (S1605). After transferring, the memory control unit discharges the buffer region secured in the image memory 42 (S1606) and terminates the process.

Figure 17:
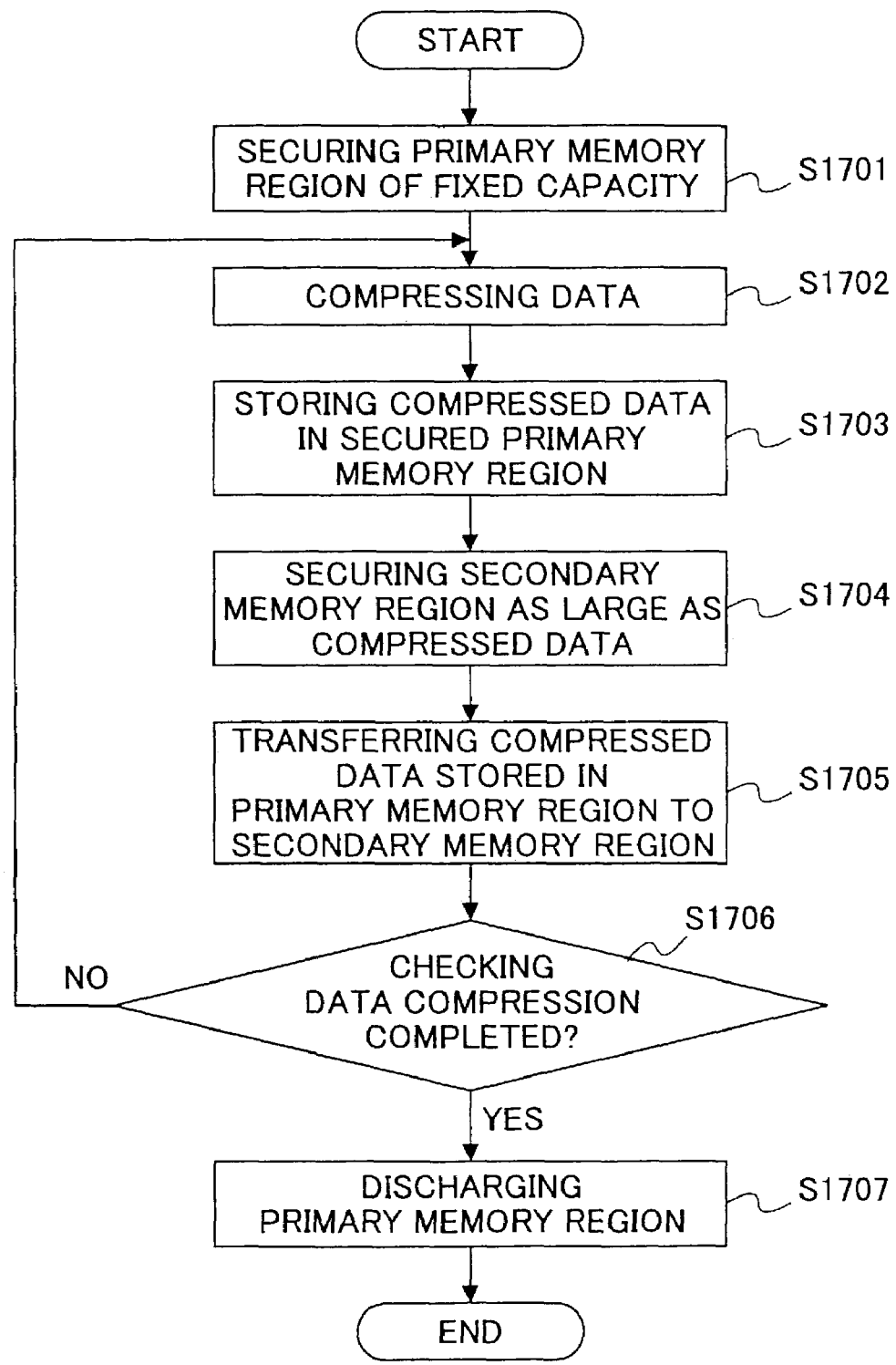
FIG. 17 is a flow chart showing an operation according to an embodiment of the present invention, in which image data stored in an image memory are divisionally transferred to an HDD.

FIG. 17 is a flow chart showing a data transfer operation in which a plurality of divisional transfers are performed.

As showed in FIG. 17, the memory control unit 43 secures a memory region of a fixed capacity in the image memory 42 as a buffer region in which the encoded image data are stored (S1701). The capacity of the buffer region secured in the image memory 42 is determined so that a part of the encoded image data can be buffered therein; however, the capacity of the buffer region is not required to be the size of the entire encoded image data.

Then, the image data are compressed by the compression/decompression unit 46 (S1702), and the compressed image data are stored in the buffer region of a fixed capacity in the image memory 42 secured in step S1701 (S1703).

The buffer region of the fixed capacity thus secured is presumed to divisionally store an item of image. If the fixed-capacity buffer region is not large enough to store the entire image data, the memory control unit 43 needs to determine whether to repeat the same process depending on whether the compression/decompression unit 46 has completed its compression process. Accordingly, the memory control unit secures a memory region in the HDD 48 of which capacity matches the data size of the encoded image data buffered in the fixed-capacity buffer region secured in the image memory 42 (S1704). The encoded image data stored in the buffer region are transferred (S1705). In other words, after a part of the encoded image data is stored in the buffer region, the memory control unit causes the HDD controller 47 to secure a memory region as large as the part of the encoded image data. Then, the part of the encoded image data is transferred between the buffer region and the memory region secured in the HDD 48. This data transfer operation is performed in the same manner as the above embodiment showed in FIG. 16.

After completing the data transfer, the memory control unit 43 checks whether the compression/decompression unit 46 has completed the encoding of the entire image data (S1706). In the case where the data compression has not been completed (No branch of S1706), the memory control unit 43 repeats the loop process starting from step S1702 until the data compression is completed. In the case where an uncompleted data compression is continued, the next part of the encoded image data overwrites the preceding part of the encoded image data stored in the fixed-sized buffer region.

After completing the image data transfer, the memory control unit 43 discharges the buffer region secured in the image memory 42 (S1707) and terminates the process.

In the above embodiment, since it is possible to estimate the data transfer performance of the HDD 48 based on the data transfer speed thereof, one can select the compression/decompression unit 46 and the primary memory unit (image memory 42), or determine an appropriate rate of occupancy of the buffer region in the image memory 42 and the memory region in the secondary memory unit (HDD 48) so as to improve their efficiency.

According to the operation described in connection with the flow chart showed in FIG. 15, depending on whether the memory control unit 43 is requested to transfer a plurality of items of image data, the memory control unit 43 determines whether to transfer an item of image data in a block or divisionally. Accordingly, the memory control unit 43 can share the time in which the secondary memory unit (HDD 48) is accessed for input and output among the plurality of items of image data by transferring the plurality of items of image data in parallel by a time sharing method. The plurality of items of image data can be efficiently transferred in parallel at a high efficiency.

Additionally, in the process where an item of image data is input, stored in the primary memory unit (image memory 42), and transferred to the secondary memory unit, it is possible to secure a buffer region of an appropriate capacity depending on the amount of data to be transferred and to avoid securing an excessive memory region. It is also possible to efficiently handle a plurality of items of image data simultaneously and control the memory units appropriately.

The next embodiment relates to a data transfer operation in a block and divisional data transfer operations selected depending on whether a plurality of data transfer requests are made. In this embodiment, it is possible to prioritize a plurality of data transfer operations.

In the case where a plurality of items of image data are divisionally transferred, an item of image data having a higher priority is transferred sooner than another item of image data having a lower priority. The principle will be explained by reference to the schematic diagrams showed in FIGS. 18A, 18B, 19A, and 19B.

Figure 18A:
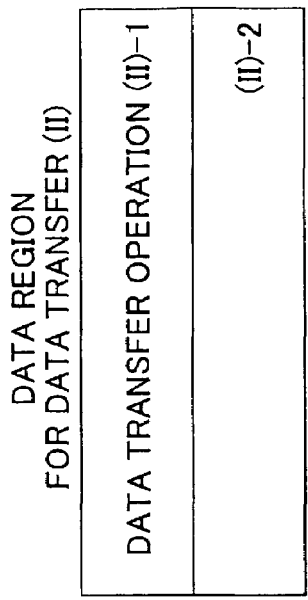
FIGS. 18A and 18B are schematic diagrams for explaining a "pattern A" operation according to an embodiment of the present invention, in which image data are divisionally transferred in the order of assigned priority in response to a plurality of requests for data transfer.
Figure 18B:
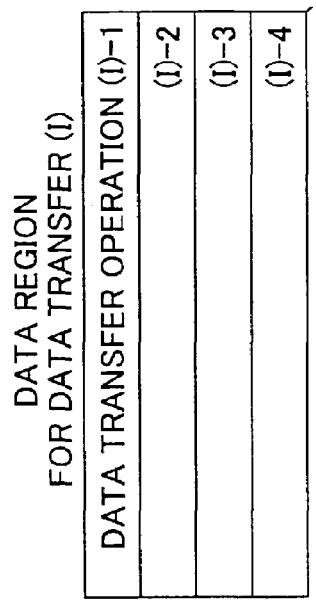

The pattern "A" showed in FIGS. 18A and 18B shows the case where a priority order is given, and the pattern "B" showed in FIGS. 19A and 19B shows the case where no priority order is given.

In order to expedite the data transfer of an item of image data having a higher priority, the higher the priority of the item of image data is, the lower the frequency (fewer number of transfers) the item of image data is transferred in. To the contrary, the lower the priority of the item of image data is, the higher the frequency the item of image data is transferred in. In FIGS. 18A and 18B, since the priority assigned to data transfer operation (II) is higher than that of data transfer operation (I), the data (II) are transferred at a lower frequency and the buffer region required to store the data (II) is set larger. In addition, in the case of FIGS. 19A and 19B where no priority is given, the frequency of the data transfer operation (I) is equal to the frequency of the data transfer operation (II), and accordingly, the buffer region required for the data transfer operation (I) is equal to the buffer region required for the data transfer operation (II).

The example showed in FIGS. 18A and 18B will be described in detail. In the pattern "A", since the priority of data transfer (I) is lower than that of data transfer (II), the transfer frequency of the data transfer (I) of which priority is lower is set at 4 times (indicated as data transfer operation (I)-1 through (I)-4 in FIGS. 18A and 18B), and the transfer frequency of the data transfer (II) of which priority is higher is set at 2 times (indicated as data transfer operation (II)-1 through (II)-2 in FIGS. 18A and 18B).

When image data are transferred divisionally, each item of image data is divisionally transferred in turn as follows: data transfer (I)-1→(II)-1→(I)-2→(II)-2→ . . . . As indicated in the "flow of data transfer operations" in FIG. 18B, the "time required for the data transfer (II)" having a higher priority is longer than the time required for the data transfer (II) in the case where only data (II) is to be transferred, by ¼ of the time required for the data transfer (I) in the case where only data (I) is to be transferred.

On the other hand, as showed in FIGS. 19A and 19B, since no priority is taken into consideration, the frequency of data transfer (I) is two, and equal to that of data transfer (II) (showed as data transfers (I)-1, (I)-2, and (II)-1, (II)-2, respectively, in FIG. 19).

In the case of divisional transfer, each item of image data is transferred divisionally in turn as follows: data transfer (I)-1→(II)-1→(I)-2→(II)-2. As showed in the flow of data transfer operations showed in FIG. 19B, since no priority is set, the time required for the data transfer operation (II) is longer than that for the data transfer operation (II) in the case where only data (II) are to be transferred, by ½ of the time required for the data transfer (I) in the case where only data (I) are to be transferred. Additionally, the time at which the data transfer operation (II) is completed is delayed for the time required for the data transfer (I)-2.

As described above, the data transfer of an item of image data having a higher priority is completed earlier in a shorter period by determining the frequency of data transfers depending on the priority.

Figure 20:
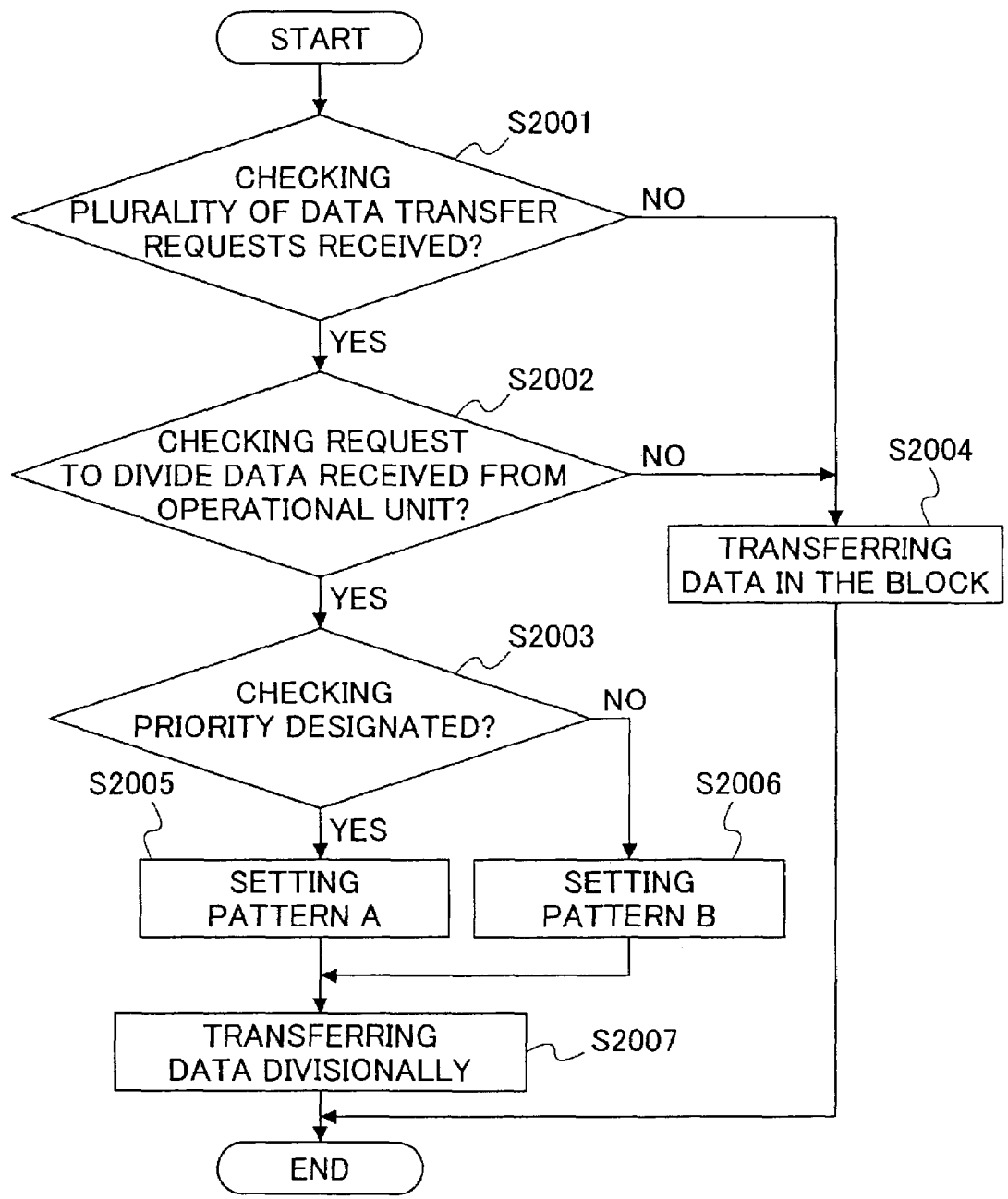
FIG. 20 is a flow chart showing an operation according to an embodiment of the present invention, in which image data are divisionally transferred in the order of assigned priority in response to a plurality of requests for data transfer.

FIG. 20 is a flow chart showing the operation of data transfer in which a plurality of items of image data having priority order are divisionally transferred.

In response to an input via the operational unit 7, the system control unit 1 gives an instruction requesting a data transfer operation (input/output) to the memory control unit 43. In response to the request from the system control unit 1 the memory control unit 43 starts transferring image data.

Besides the request for the data transfer operation, one can make a request, in the case where the additional data transfer now being requested makes a plurality of images in total, to divisionally transfer the plurality of items of image data, and/or to prioritize the plurality of items of image data.

In this process, the memory control unit 43 checks whether it has received a plurality of requests for data transfer to follow different branches in the process depending on whether the plurality of requests have been made (S2001).

In the case the memory control unit 43 receives a plurality of requests for data transfer (Yes branch of S2001), the memory control unit 43 checks whether it has received a request for the items of the image data to be divisionally transferred to the HDD 48 (secondary memory apparatus) via the image memory 42 (primary memory unit) (S2002).

If a request for divisional transfer is made by the operational unit (Yes branch of S2002), the memory control unit checks whether a priority is designated when the request for divisional transfer is made (S2003). If a priority is designated (Yes branch of S2003), the memory control unit performs setting to transfer the plurality of images by the "pattern A" (see FIG. 18) (S2005). Additionally, if no priority is designated (No branch of S2003), the memory control unit performs setting to transfer the plurality of images by the "pattern B" (see FIG. 19) (S2006)

The memory control unit 43 transfers the plurality of images divisionally in accordance with the "pattern A" or the "pattern B" designated in steps S2005 and S2006, respectively (S2007), and terminates this process.

On the other hand, in the case a plurality of requests for data transfer is not received (No branch of S2001), or a plurality of request for data transfer is received but no request for divisional transfer is received (No branch of S2002), the memory control unit 43 transfers the items of image data:in a block to the HDD 48 through the buffer region of the image memory 42 (S2004), then terminates this process.

In addition, the step of divisional data transfer (S2007) and the step of data transfer in a block (S2004) in this process showed in FIG. 20 are performable by following the steps of divisional data transfer showed in FIG. 14 and the steps of data transfer in the block showed in FIG. 13, respectively.

The next embodiment relates to the operation of divisional transfers and a transfer in a block selected depending on whether a plurality of requests of data transfer are made. According to this embodiment, compared with the embodiment showed in FIG. 15, one can set the frequency of transfers (the number of divisional transfers) in addition to designating divisional transfers.

The data transfer operation based on the designated frequency will be described in detail.

In this embodiment, in the case where a plurality of images are divisionally transferred, the frequency of transfers (the number of divisional transfers) can be set through the operational unit. Because an operator can select the frequency of transfers depending on the condition, the operator can efficiently use the memory region, improve the processing efficiency, and optimize the operation.

Figure 21:
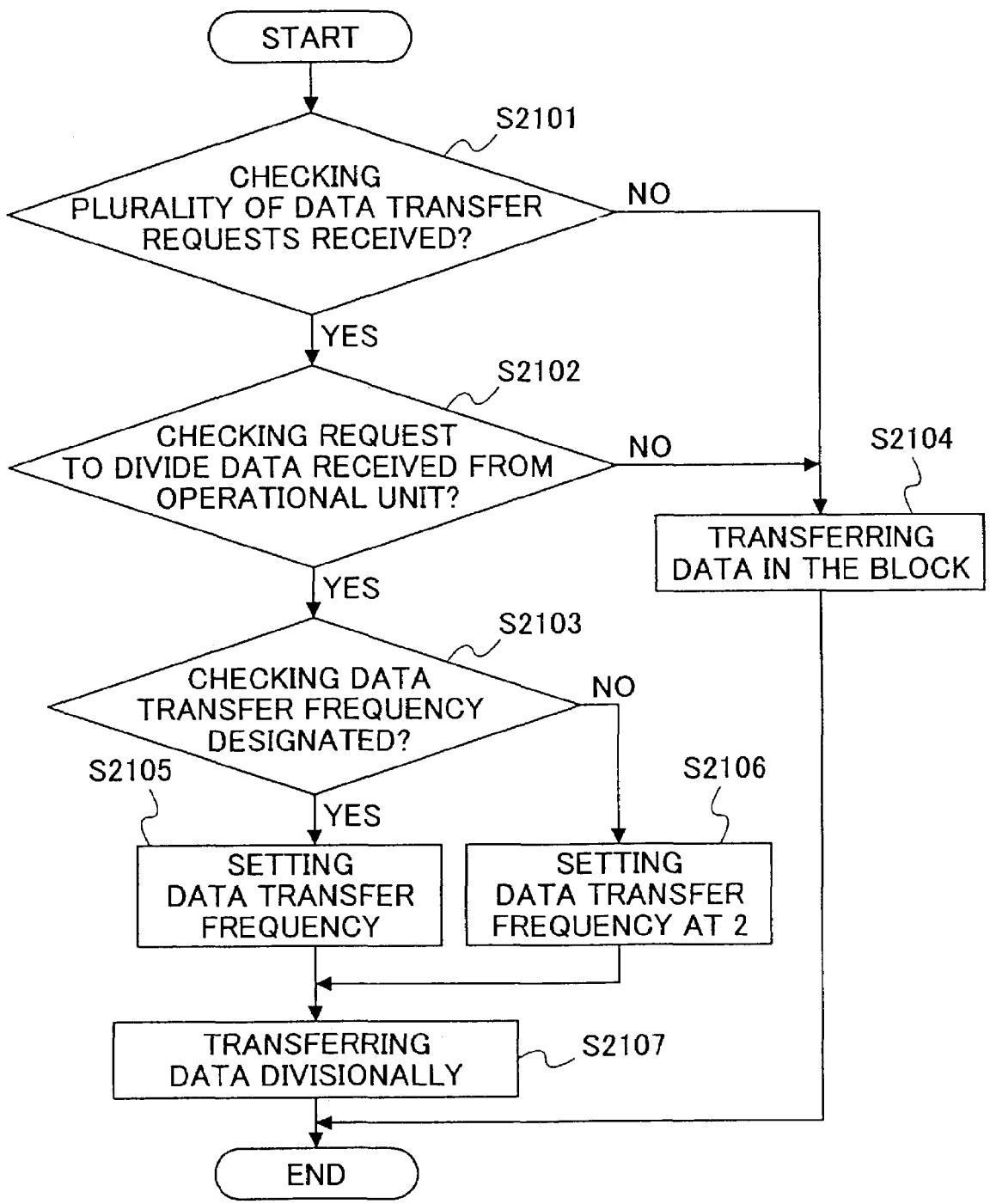
FIG. 21 is a flow chart showing an operation according to an embodiment of the present invention, in which image data are divisionally transferred in a designated number of divisions in response to a plurality of requests for data transfer.

FIG. 21 is a flow chart showing the operation of this embodiment that performs divisional transfers based on the designated frequency of transfers when a plurality of images are requested to be transferred.

As showed in FIG. 21, in response to the setting of the operational unit 7, the system control unit 1 requests the memory control unit 43 to transfer (input/output) data, and in response to the request, the memory control unit 43 starts transferring the image data. In the case where the image data that the operator is now setting requires simultaneous processing, the memory control unit gives an instruction for divisionally transferring the plurality of images, and enables the operator to designate the frequency of transfers.

Depending on whether another request to transfer data (input/output) is received while the image data that are requested are being processed, the memory control unit performs different branches. The memory control unit first checks whether it has received a plurality of requests to transfer data (S2101).

In the case where a plurality of requests to transfer data have been received (Yes branch of S2101), the memory control unit 43 can divisionally transfer an item of images to the HDD 48 via the buffer region of the image memory 42 in a plurality of frequencies. The memory control unit 43 checks, whether the operational unit 7 makes a request to divisionally transfer data (S2102).

If the memory control unit 43 receives a request to divisionally transfer data from the operational unit (Yes branch of S2102), the memory control unit 43 further checks whether the number of divisional data transfers is adequately input by the operational unit 7 (S2103). As the result, if the number of data transfers is designated (Yes branch of S2103), the setting to perform the data transfers of the designated frequency is made (S2105). If the frequency of the data transfers is not appropriately designated (for example, no input is made or an unrealistic value is input) (No branch of S2103), the frequency of data transfers is set at "2" as a default value, for example, to perform the transfer operation (S2106).

Next, the plurality of items of image data are divisionally transferred based on the value set in respective steps S2105 and S2106 (S2107) and this process is terminated.

On the other hand, if the memory control unit 43 does not receive a plurality of transfer requests (No branch of S2101), or the memory control unit 43 receives a plurality of transfer requests but no request for divisional transfers is received from the operational unit (No branch of S2102), an item of images (a unit image) is transferred in a block to the HDD 48 via the buffer region of the image memory 42 (S2104), and this process is terminated.

In this embodiment, whether a request for divisional transfers is made by the operational unit is checked in the flow chart (S2102). As it will become obvious from this fact, a divisional data transfer is not necessarily made unconditionally in the case where a plurality of data transfer requests are made, but if there is, no request for divisional transfer, a data transfer in a block is made. Even in this step, it is possible to control the data transfer, divisional or in a block, by performing a selecting operation.

The divisional data transfer (S2107) and the block data transfer (S2104) in the flow chart showed in FIG. 21 can be embodied by applying the divisional transfer operation of FIG. 14 or the block transfer operation of FIG. 13, respectively.

The next embodiment relates to a transfer performed by selecting divisional or block transfer operations depending on whether a plurality of data transfer requests are made. According to this embodiment, in the operation of the above embodiment (see the flow chart of FIG. 15), when a plurality of items of image data that are requested to be transferred are divisionally transferred, an amount of memory capacity designated by an input is secured in the primary memory unit (image memory 42) to perform the transfer.

The transfer operation that is performed by securing a memory region of which amount is designated by the input will be described in detail below.

In this process, the capacity of the buffer region to be secured in the primary memory unit can be set by the operational unit. In the case where a plurality of items of image data are divisionally transferred, the operator can designate the capacity depending on the condition. Accordingly, the memory region is used efficiently, the processing efficiency is improved, and the operation is optimized.

Figure 22:
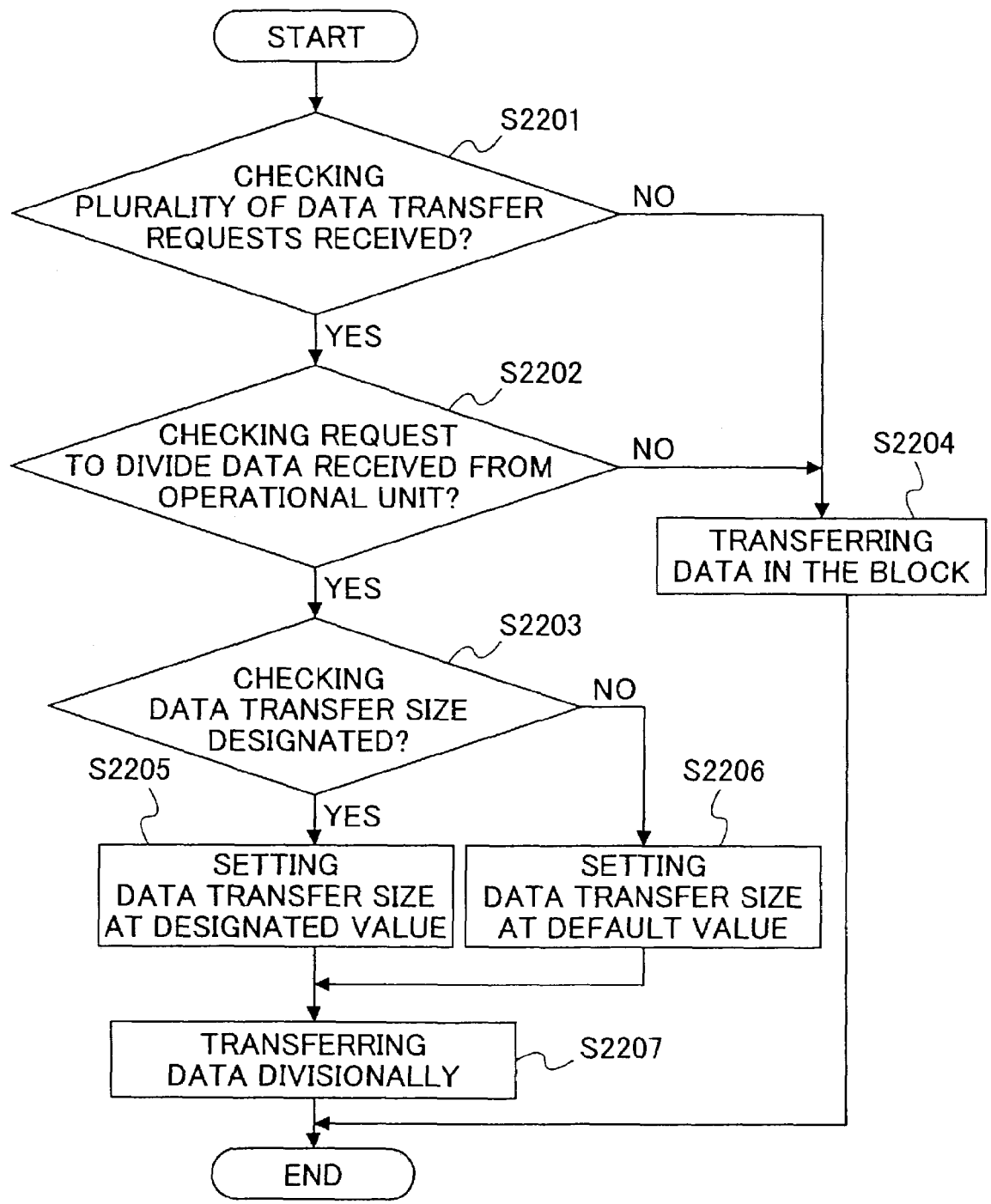
FIG. 22 is a flow chart showing an operation according to an embodiment of the present invention, in which image data are divisionally transferred by a designated amount in response to a plurality of requests for data transfer.

FIG. 22 is a flow chart of this embodiment that transfers based on the designated capacity in response to a transfer request of a plurality of items of image data.

As showed in FIG. 22, in response to setting of the operational unit 7, the system control unit 1 requests the memory control unit 43 to transfer data (input/output), and in response to the request, the memory control unit 43 starts transferring the image data. An operator can set the digital copier so that it processes the image as usual. Besides this setting, in the case where if the image data the operator is now setting are requested to be transferred, the number of items of image data becomes plural, and accordingly simultaneous transfer of a plurality of items of image data is required, the memory control unit 43 gives an instruction to transfer a plurality of images and accept the setting of the capacity of the buffer region secured in the primary memory unit (image memory 42) that is used in the divisional transfer.

According to the flow chart, a different branch is performed depending on whether, while the image data that are requested to be processed are transferred, an additional request for data transfer (input/output) is made. Accordingly, whether a plurality of transfer requests are received is checked first (S2201).

In the case where a plurality of transfer requests are received (Yes branch of S2201), an item of image (a unit image) is divisionally transferred in a plurality of frequencies to the HDD 48 via the buffer region of the image memory 42. Accordingly, the memory control unit 43 checks whether a request for divisional transfers is made by the operational unit 7 (S2202).

In the case where a request for divisional transfers is made from the operational unit (Yes branch of S2202), the memory control unit 43 further checks whether the capacity of the buffer region to be secured in the image memory 42 is adequately set by the key input of the operational unit 7 (S2203). If the capacity of the buffer region is designated (Yes branch of S2203), the memory control unit sets to transfer the plurality of images by securing the designated capacity (S2205). In the case where the capacity of the buffer region is not designated appropriately (for example, no input is made or an impossible value is input) (No branch of S2203), the memory control unit secures the buffer region of a predetermined capacity given as a default value (S2206).

A plurality of items of image data are divisionally transferred based on the values set in steps S2205 and S2206, respectively (S2207), and this process is terminated.

On the other hand, in the case where a plurality of requests for transfer are not received (No branch of S2201), or in the case where, a plurality of requests for transfer are received but a divisional transfer request is not received from the operational unit (No branch of S2202), the unit image (an item of image) is transferred in a block to the HDD 48 through the buffer region of the image memory 42 (S2204) and then, the process is terminated.

The next embodiment is related to a transfer operation by the divisional operation or the block operation selected depending on whether a plurality of transfer requests are made.

In this embodiment, image data to which a priority is assigned are transferred first at priority (that is, transferred in a block).

Figure 23:
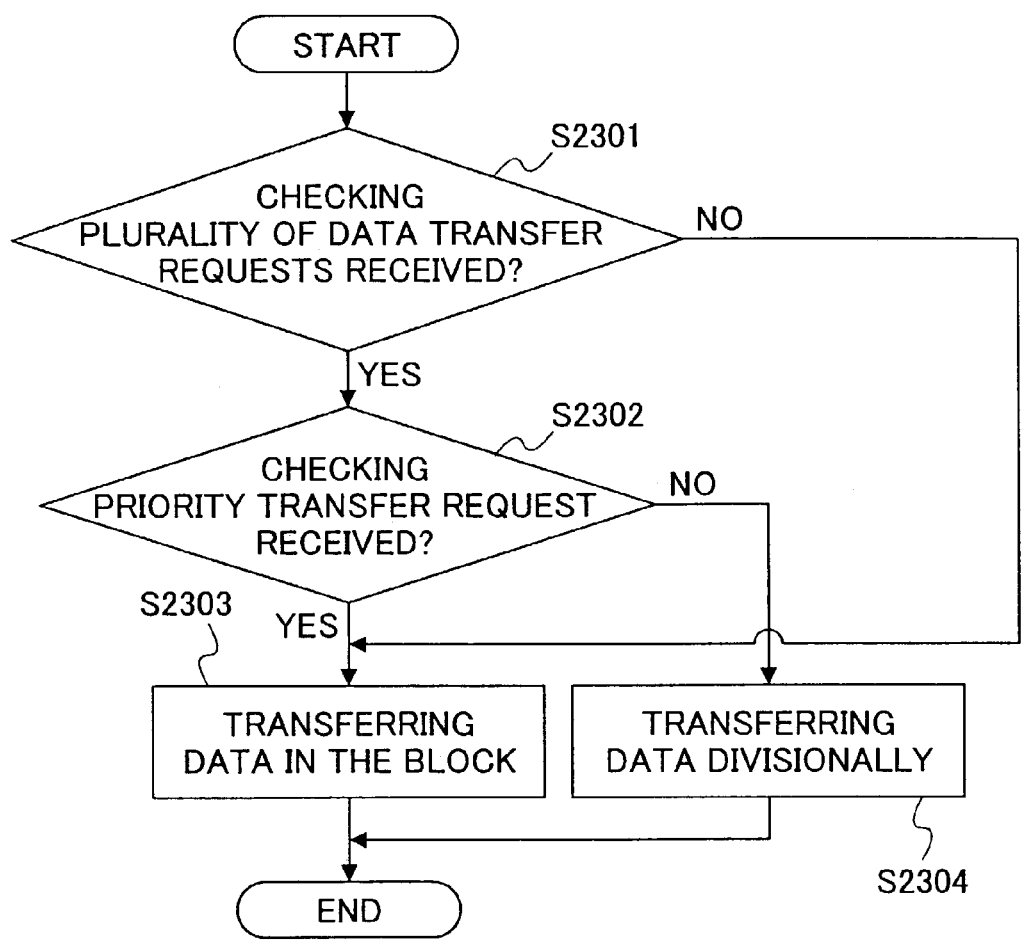
FIG. 23 is a flow chart showing an operation according to an embodiment of the present invention, in which image data having higher priorities are transferred first in response to a plurality of requests for data transfer.

FIG. 23 is a flow chart showing an operation where, when a plurality of image data are requested to be transferred, a prioritized image is transferred faster than the others.

As showed in FIG. 23, in response to setting of the operational unit 7, the system control unit 1 requests the memory control unit 43 to transfer data (input/output), and in response to the request, the memory control unit 43 starts transferring the image data. In some cases, an additional request for data transfer operation (input/output) is made before, or while, a received request is being processed, that is, a plurality of requests for data transfer are received. Because, in this embodiment, a different branch is selected depending on whether a plurality of transfer requests are made, the memory control unit 43 checks whether a plurality of requests for transfer are received (S2301).

In the case where a plurality of requests for transfer operations are received (Yes branch of S2301), a unit image (an item of image) is divisionally transferred in a plurality of On the other hand, if a plurality of requests for transfer operations are not received (No branch of S2301), a unit image (an item of image) is transferred in a block to the HDD 48 via the buffer region of the image memory 42 (S2303), and the memory control unit 43 exits the process.

In addition, the block data transfer (S2303) and the divisional data transfer (S2304) in the flow chart of FIG. 23 are performed by applying the block transfer operation of FIG. 13 and the divisional transfer operation of FIG. 14, respectively.

In summary, according to the first aspect of the present invention, when image data are transferred from the buffer region of the primary memory unit to the secondary memory unit, a unit image is transferred in a block, or divisionally in a plurality of frequencies, and when a plurality of images are transferred simultaneously, each image is divisionally transferred in a plurality of frequencies so that the plurality of images can be transferred in parallel by time-sharing. Accordingly, each input and output of an image signal can evenly share the time of the secondary memory image, and a plurality of images can be efficiently transferred in parallel in a short time. Especially, because the secondary memory apparatuses such as an HDD, a CD-R, and a CD-RW basically cannot transfer data between the primary memory unit and the secondary memory unit in both directions simultaneously, divisional transfers are highly effective.

According to the second aspect of the present invention, in addition to the above effect, a buffer region of which capacity depends on the frequency of transfers of a unit image is secured in the primary memory unit, and a unit image is divisionally transferred. Accordingly, the divisional transfer for the unit image can be performed at the optimum condition.

According to the third aspect of the present invention, in addition to the above effect, the frequency of transfers for each image is determined based on a priority assigned thereto (that is, the higher the priority is, the less the frequency of transfer becomes). Accordingly, an image having a higher priority can be transferred in a shorter time period.

According to the fourth aspect of the present invention, in addition to the effect of the first aspect, a buffer capacity (primary memory unit) is given by a designation and a unit image is divisionally transferred. Accordingly, the unit image can be transferred at an optimum condition.

According to the fifth aspect of the present invention, in addition to the effect of the first through fourth aspects, when a plurality of images are simultaneously transferred divisionally for a plurality of frequencies, a transfer of an image that is prioritized is prohibited from being transferred divisionally so that the image is transferred in a block. Accordingly, the image can be transferred at the highest speed if necessary, and the performance of the image processing apparatus can be improved.

The preferred embodiments of the present invention are described above. The present invention is not limited to these embodiments, but various variations and modifications may be made without departing from the scope of the present invention.

This patent application is based on Japanese priority patent application No. 2001-396251 filed on Dec. 27, 2001, and No. 2001-396252 filed on Dec. 27, 2001, the entire contents of both of which are hereby incorporated by reference.

What is claimed is:

1. An image processing apparatus, comprising:
a primary memory unit that buffers an image data item;
a secondary memory unit that stores said image data item transferred from said primary memory unit; and
a memory control unit that controls the transfer of the image data item from said primary memory unit to said secondary memory unit, said memory control unit configured to transfer the image data item through a single transfer operation and to transfer the image data item through a plurality of partial transfer operations, wherein
if a plurality of image data items are to be transferred concurrently from said primary memory unit to said secondary memory unit, said memory control unit transfers each image data item through a plurality of partial transfer operations.

2. The image processing apparatus as claimed in claim 1, wherein said memory control unit, if the plurality of image data items are to be transferred, secures a buffer region in said primary memory unit, a size of the buffer region being determined based on a number of the partial transfer operations of one of the plurality of image data items.

3. The image processing apparatus as claimed in claim 2, wherein the number of the partial transfer operations is determined based on a priority order assigned to the plurality of image data items.

4. The image processing apparatus as claimed in claim 1, wherein said memory control unit, if the plurality of image data items are to be transferred, secures a buffer region in said primary memory unit, a size of the buffer region being set to a size given from a user.

5. The image processing apparatus as claimed in claim 1, wherein if one or more of the plurality of image data items is given priority designated by a user, said memory control unit transfers the one or more of the plurality of image data items given priority through a single transfer operation instead of partial transfer operations.

6. The image processing apparatus as claimed in claim 1, wherein said memory control unit, if the image data item is to be transferred through a single transfer operation of an entire image data item, secures a buffer region in said primary memory unit, a size of said buffer region being substantially equal to a size of a partial image data item to be transferred.

7. The image processing apparatus as claimed in claim 1, wherein said memory control unit, if the image data item is to be transferred through a plurality of partial transfer operations, secures a buffer region in said primary memory unit, a size of the buffer region being substantially equal to a size of a partial image data item to be transferred through a partial transfer operation.

8. The image processing apparatus as claimed in claim 1, further comprising a compression/decompression unit that compresses an image data item which is consequently stored in said primary memory unit,
wherein said memory control unit transfers the compressed image data item stored in said primary memory unit to said secondary memory unit.

9. An image processing apparatus, comprising:
a primary memory means for buffering an image data item;
a secondary memory means for storing said image data item transferred from said primary memory means;
means for determining whether a plurality of image data items are to be transferred concurrently from said primary memory means to said secondary memory means; and
means for transferring, if a determination is made that the plurality of image data items are to be transferred concurrently from said primary memory means to said secondary memory means, each image data item through a plurality of partial transfer operations, and otherwise the entire image data item is transferred through a single transfer operation.

10. The image processing apparatus as claimed in claim 9, further comprising:
means for securing, if the plurality of image data items are to be transferred, a buffer region in said primary memory means, a size of the buffer region being determined based on a a number of the partial transfer operations of one of the plurality of image data items.

11. The image processing apparatus as claimed in claim 10, wherein the number of the partial transfer operations is determined based on a priority order assigned to the plurality of image data items.

12. The image processing apparatus as claimed in claim 9, further comprising:
means for securing, if the plurality of image data items are to be transferred, a buffer region in said primary memory means, a size of the buffer region being set to a size given from a user.

13. The image processing apparatus as claimed in claim 9, wherein
if one or more of the plurality of image data items is given priority designated by a user, said memory control unit transfers the one or more of the plurality of image data items given priority through a single transfer operation instead of partial transfer operations.

14. The image processing apparatus as claimed in claim 9, further comprising:
means for securing, if an image data item is to be transferred through a single transfer operation of the entire image data item, a buffer region in said primary memory means, a size of the buffer region being substantially equal to a size of the image data item to be transferred.

15. The image processing apparatus as claimed in claim 9, further comprises:
means for securing, if an image data item is to be transferred through a plurality of partial transfer operations, a buffer region in said primary memory means, a size of the buffer region being substantially equal to a size of a partial image data item to be transferred through a partial transfer operation.

16. The image processing apparatus as claimed in claim 9, further comprising means for compressing an image data item which is consequently stored in said primary memory means,
wherein said means for transferring transfers the compressed image data item stored in said primary memory means to said secondary memory means.

17. A method of controlling a transfer of an image data item between a primary memory unit and a secondary memory unit, comprising:
storing an image data item in said primary memory unit;
determining whether a plurality of image data items are to be transferred concurrently from said primary memory unit to said secondary memory unit;
if a determination is made that the plurality of image data items are to be transferred concurrently from said primary memory unit to said secondary memory unit, transferring each image data item through a plurality of partial transfer operations; and otherwise transferring the entire image data through a single transfer operation.

18. The method as claimed in claim 17, further comprising:

securing, if the plurality of image data items are to be transferred, a buffer region in said primary memory unit, a size of the buffer region being determined based on a number of partial transfer operations of one of the plurality of image data items.

19. The method as claimed in claim 18, wherein the number of the partial transfer operations is determined based on a priority order assigned to the plurality of image data items.

20. The method as claimed in claim 17, further comprising:

securing, if the plurality of image data items are to be transferred, a buffer region in said primary memory unit, a size of the buffer region being set to a size given from a user.

* * * * *